(12) United States Patent
Murphy et al.

(10) Patent No.: US 12,405,525 B2
(45) Date of Patent: Sep. 2, 2025

(54) ACTIVELY SELECT LENSES FOR CAMERA FOCUS PROCESSES

(71) Applicant: Aptiv Technologies AG, Schaffhausen (CH)

(72) Inventors: Morgan Daniel Murphy, Kokomo, IN (US); Ronald M. Taylor, Greentown, IN (US)

(73) Assignee: Aptiv Technologies AG, Schaffhausen (CH)

( * ) Notice: Subject to any disclaimer, the term of this patent is extended or adjusted under 35 U.S.C. 154(b) by 687 days.

(21) Appl. No.: 17/657,351

(22) Filed: Mar. 30, 2022

(65) Prior Publication Data

US 2023/0199311 A1 Jun. 22, 2023

Related U.S. Application Data

(60) Provisional application No. 63/265,927, filed on Dec. 22, 2021, provisional application No. 63/265,929, filed on Dec. 22, 2021.

(51) Int. Cl.
*G03B 43/00* (2021.01)
(52) U.S. Cl.
CPC .................................. *G03B 43/00* (2013.01)
(58) Field of Classification Search
CPC ............................ G03B 43/00; G01M 11/0292
See application file for complete search history.

(56) References Cited

U.S. PATENT DOCUMENTS 4,693,555 A 9/1987 Arai et al.
6,144,510 A 11/2000 Neil et al.
(Continued)

FOREIGN PATENT DOCUMENTS

CN 102472884 A 5/2012
CN 202975472 U 6/2013
(Continued)

OTHER PUBLICATIONS

"Extended European Search Report," EP Application No. 23163100.3, Sep. 18, 2023, 8 pages.
(Continued)

*Primary Examiner* — Clayton E. LaBalle
*Assistant Examiner* — Fang-Chi Chang
(74) *Attorney, Agent, or Firm* — Harness, Dickey & Pierce, P.L.C.

(57) ABSTRACT

The techniques of this disclosure relate to actively selecting lenses for camera focus processes. Test equipment may check lenses by dry-fit aligning them to a particular set of production components. If minimum focus performance cannot be achieved, then the lenses go unused for a final camera assembly. In certain situations, the unused set of lenses is salvageable for use in another camera assembly. Advanced CMAT equipment may compute and apply a rotation for unused lenses to improve their focus performance the next time they are used in a final assembly. A maximum number of attempts to rotationally fix a set of lenses may be observed to avoid trying the same lenses again and again, possibly without ever having success. This way, because the lenses actively selected can also be rotated during production, final camera assemblies can be produced that are likely to pass the EOLT, and by minimizing waste.

20 Claims, 11 Drawing Sheets

(56) References Cited

U.S. PATENT DOCUMENTS

| | | | |
|---|---|---|---|
| 10,362,203 | B2 | 7/2019 | Taylor et al. |
| 10,408,416 | B2 | 9/2019 | Khorasaninejad et al. |
| 10,437,012 | B1 | 10/2019 | Gurin |
| 11,089,188 | B1 | 8/2021 | Taylor et al. |
| 11,089,197 | B1 | 8/2021 | Taylor et al. |
| 11,201,993 | B1 | 12/2021 | Wang et al. |
| 11,431,881 | B2 | 8/2022 | Taylor et al. |
| 2003/0226951 | A1 | 12/2003 | Ye et al. |
| 2007/0165131 | A1 | 7/2007 | Ish-Shalom et al. |
| 2007/0221826 | A1 | 9/2007 | Bechtel et al. |
| 2010/0265048 | A1 | 10/2010 | Lu et al. |
| 2011/0080479 | A1 | 4/2011 | Trumbo et al. |
| 2013/0274923 | A1 | 10/2013 | By |
| 2015/0293330 | A1 | 10/2015 | Gutierrez |
| 2016/0094841 | A1 | 3/2016 | Wang et al. |
| 2017/0082263 | A1 | 3/2017 | Byrnes et al. |
| 2017/0146806 | A1 | 5/2017 | Lin et al. |
| 2017/0195545 | A1 | 7/2017 | Campbell et al. |
| 2017/0201744 | A1 | 7/2017 | Wong et al. |
| 2017/0219739 | A1 | 8/2017 | Lin et al. |
| 2017/0295306 | A1 | 10/2017 | Mleczko |
| 2018/0059354 | A1 | 3/2018 | Gutierrez et al. |
| 2018/0292644 | A1 | 10/2018 | Kamali et al. |
| 2019/0094489 | A1 | 3/2019 | Dobashi |
| 2019/0154877 | A1 | 5/2019 | Capasso et al. |
| 2019/0170314 | A1 | 6/2019 | Enef et al. |
| 2019/0178720 | A1 | 6/2019 | Padilla et al. |
| 2019/0383969 | A1 | 12/2019 | Badano et al. |
| 2020/0001787 | A1 | 1/2020 | Lu et al. |
| 2020/0096672 | A1 | 3/2020 | Yu et al. |
| 2020/0099851 | A1 | 3/2020 | Chino et al. |
| 2020/0183050 | A1 | 6/2020 | Lin et al. |
| 2020/0225386 | A1 | 7/2020 | Tsai et al. |
| 2020/0264343 | A1 | 8/2020 | Han et al. |
| 2020/0319423 | A1* | 10/2020 | Liu .................... G02B 7/025 |
| 2021/0003382 | A1 | 1/2021 | Adie et al. |
| 2021/0044748 | A1 | 2/2021 | Hu et al. |
| 2021/0068665 | A1 | 3/2021 | Pahlevaninezhad et al. |
| 2021/0080819 | A1 | 3/2021 | Terasawa et al. |
| 2021/0132272 | A1 | 5/2021 | Zhu et al. |
| 2021/0172879 | A1 | 6/2021 | Chen et al. |
| 2021/0235001 | A1 | 7/2021 | Taylor et al. |
| 2021/0307608 | A1 | 10/2021 | Hu et al. |
| 2021/0337095 | A1 | 10/2021 | Taylor et al. |
| 2021/0337140 | A1 | 10/2021 | Siddique et al. |
| 2022/0006932 | A1 | 1/2022 | Bae et al. |

FOREIGN PATENT DOCUMENTS

| | | |
|---|---|---|
| CN | 104520754 A | 4/2015 |
| CN | 105445889 A | 3/2016 |
| CN | 108241208 A | 7/2018 |
| CN | 108802862 A | 11/2018 |
| CN | 208283579 U | 12/2018 |
| CN | 109164518 A | 1/2019 |
| CN | 109507765 A | 3/2019 |
| CN | 110455418 A | 11/2019 |
| CN | 109391754 B | 11/2020 |
| EP | 3385766 A1 | 10/2018 |
| EP | 3445050 A1 | 2/2019 |
| EP | 3855246 A1 | 7/2021 |
| EP | 3992671 A1 | 5/2022 |
| IN | 109561243 A | 4/2019 |
| IN | 111103739 A | 5/2020 |
| WO | 2018118984 A1 | 6/2018 |
| WO | 2020214617 A1 | 10/2020 |

OTHER PUBLICATIONS

Jacob Engelberg et al., "Near-IR wide field-of-view Huygens metalens for outdoor imaging applications", Arxiv.org, Cornell University Library, 201 Olin Library Cornell University, Ithaca, NY 14853, Jan. 22, 2019, XP081006647, 21 pages.

"Extended European Search Report", EP Application No. 22197227.6, May 19, 2023, 11 pages.

"Extended European Search Report", EP Application No. 22197707.7, May 19, 2023, 11 pages.

Bitzer, et al., "Active Alignment for Cameras in Mobile Devices and Automotive Applications", 2010 12th Electronics Packaging Technology Conference, Dec. 8, 2010, pp. 260-264.

Bräuniger, et al., "Automated Assembly of Camera Modules using Active Alignment with up to Six Degrees of Freedom", Mar. 8, 2014, 8 pages.

"Extended European Search Report", EP Application No. 22198914.8, Aug. 22, 2023, 9 pages.

"Extended European Search Report", EP Application No. 20207221.1, Mar. 26, 2021, 8 pages.

"Extended European Search Report", EP Application No. 21181685.5, Nov. 24, 2021, 10 pages.

"Foreign Office Action", CN Application No. 202011378329.3, Dec. 31, 2021, 27 pages.

Afridi, et al., "Electrically Driven Varifocal Silicon Metalens", Oct. 2018, 17 pages.

Ding, et al., "Graphene aperture-based metalens for dynamic focusing of terahertz waves", Oct. 15, 2018, 13 pages.

Jang, et al., "Complex wavefront engineering with disorder-engineered metasurfaces", Jun. 27, 2017, 21 pages.

Jin, et al., "Temperature-tuned and excellent omnidirectional bending of light to the normal for energy concentration in an index-continuous structure", Jul. 27, 2020, 10 pages.

Kamali, et al., "Conformal and Tunable Optical Dielectric Metasurfaces Based on Flexible Stretchable Substrates", Oct. 2016, pp. 406-407.

Khorasaninejad, et al., "Metalenses at Visible Wavelengths: Diffraction-limited Focusing and Subwavelength Resolution Imaging", Jun. 3, 2016, pp. 1190-1193.

Li, et al., "A Metalens-Based Virtual Reality (VR) / Augmented Reality (AR) System", Jan. 2020, 2 pages.

Liu, et al., "Ultrathin van der Waals metalenses", Oct. 2018, 22 pages.

She, et al., "Adaptive Metalenses with Simultaneous Electrical Control of Focal Length, Astigmatism, and Shift", Feb. 23, 2018, 8 pages.

Yang, et al., "Multiobjective Firefly Algorithm for Continuous Optimization", Apr. 2013, 17 pages.

Yu, et al., "Flat Optics with Designer Metasurfaces", Nature Materials, vol. 13, Feb. 2014, pp. 139-150.

"Epoxy Adhesive Application Guide", Epoxy Technology, Jan. 1, 2016, 48 pages.

"Extended European Search Report", EP Application No. 18185005.8, Oct. 31, 2018, 7 pages.

"Foreign Office Action", CN Application No. 201810876682.0, Apr. 10, 2020, 12 pages.

"Foreign Office Action", CN Application No. 202110698978.X, Jun. 29, 2022, 16 pages.

"Foreign Office Action", EP Application No. 18185005.8, May 12, 2021, 4 pages.

"Foreign Office Action", EP Application No. 18185005.8, Sep. 8, 2020, 5 pages.

"Foreign Office Action", EP Application No. 18185005.8, Nov. 11, 2019, 7 pages.

Yacobi, et al., "Adhesive Bonding in Microelectronics and Photonics", Journal of Applied Physics, American Institute of Physics, vol. 91, No. 10, May 15, 2002, 36 pages.

"Foreign Office Action", CN Application No. 202011378329.3, Jan. 28, 2023, 11 pages.

"Foreign Office Action", EP Application No. 20207221.1, Apr. 13, 2023, 5 pages.

"Foreign Office Action", CN Application No. 202011378329.3, Sep. 5, 2022, 16 pages.

First Office Action regarding Chinese Patent Application No. 202211650669.6, dated Mar. 31, 2025. Translation provided.

* cited by examiner

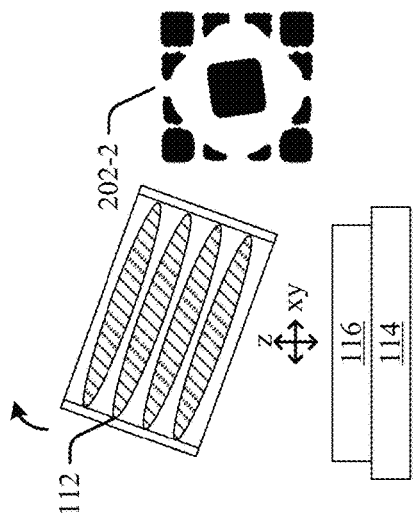
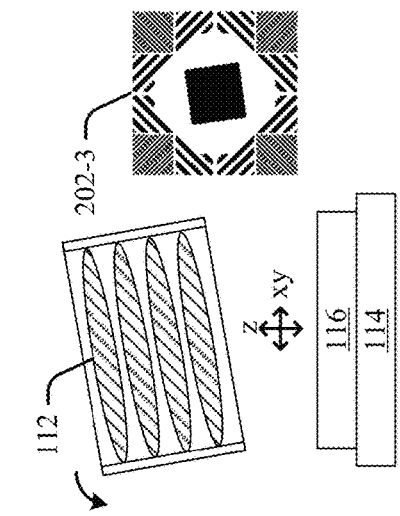
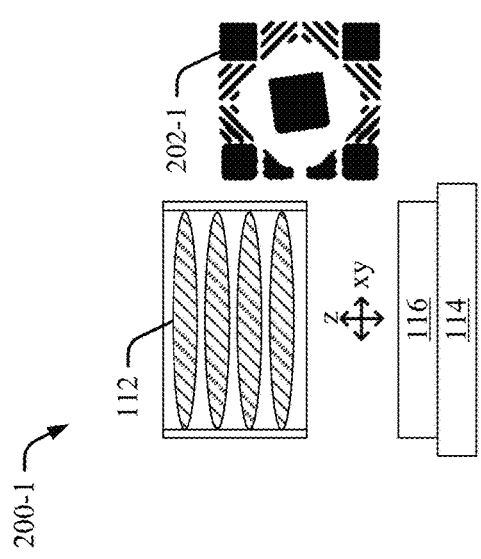
*FIG. 2-1*
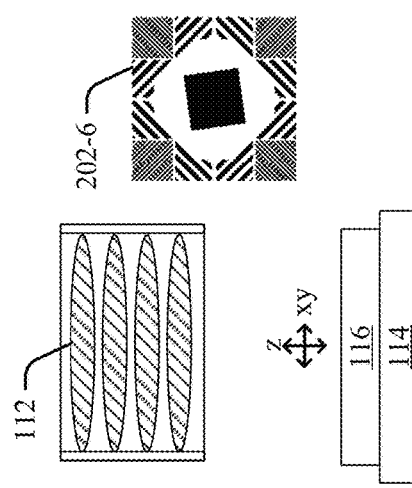
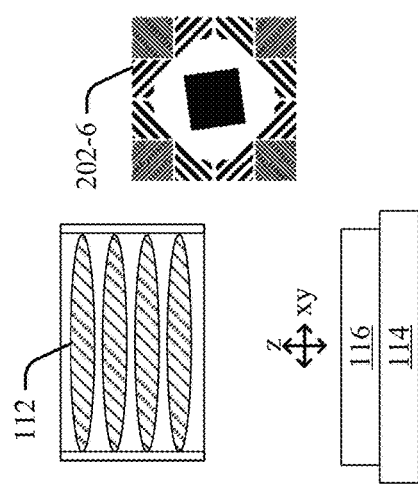
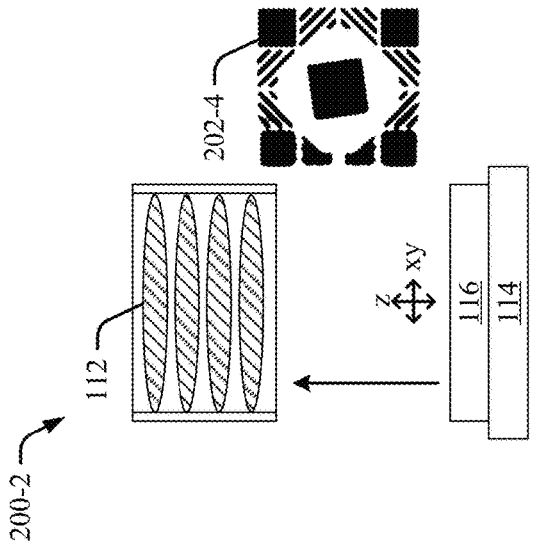
*FIG. 2-2*

ACTIVELY SELECT LENSES FOR CAMERA FOCUS PROCESSES

CROSS-REFERENCE TO RELATED APPLICATIONS

This application claims the benefit of U.S. Provisional Patent Application No. 63/265,927, filed Dec. 22, 2021, and U.S. Provisional Patent Application No. 63/265,929, filed Dec. 22, 2021, which are incorporated by reference herein in their entireties.

BACKGROUND

Cameras are common in vehicles and serve a variety of purposes; images can be used alone or in combination with other sensor data to enable advanced safety functions, and semi-autonomous or even fully-autonomous controls. A modulation transfer function (MTF) is a performance measurement of camera systems. The MTF of a camera depends on its ability to focus a lens. Achieving a particular MTF performance may be a critical requirement for a final camera assembly. Camera modular alignment and test (CMAT) equipment may be used to check focus ability of a set of lens prior to using them in production. However, the focus ability of lenses can change during from one camera to the next because of small variations in adhesives or other subtle final assembly conditions that alter the lenses' ability to focus. Even if the lenses satisfy initial MTF checks, the MTF performance measured by an end of line tester (EOLT) may be insufficient because of variations that occur during final assembly (e.g., the lenses being integrated with production components).

SUMMARY

This document describes one or more aspects to actively select lenses for camera focus processes. In one example, a method includes identifying, by a processor of camera modular alignment and test (CMAT) equipment, a set of camera components and a corresponding set of lenses that are loaded into the CMAT equipment for producing a portion of a final camera assembly. The method further includes controlling, by the processor, the CMAT equipment to: dry-fit assemble the lenses with the camera components and execute an initial five-axis lens alignment check that measures an initial modulation transfer function (MTF) performance for the lenses when dry-fit assembled with the camera components. The method further includes determining, by the processor, whether the initial MTF performance satisfies a MTF threshold, and responsive to determining that the initial MTF performance satisfies the MTF threshold, further controlling the CMAT equipment to: apply adhesive material to interfaces on surfaces of the camera components, dry-fit assemble the lenses with the camera components after the adhesive material is applied, and execute a subsequent five-axis lens alignment check that measures subsequent MTF performance for the lenses when dry-fit assembled with the camera components after the adhesive material is applied. The method includes further controlling the CMAT equipment to cure the adhesive material for outputting the portion of the final camera assembly if the subsequent MTF performance satisfies the MTF threshold.

In another example, a method includes identifying, by a processor of CMAT equipment, a set of camera components and a corresponding set of first lenses that are loaded into the CMAT equipment for producing a portion of a final camera assembly, controlling, by the processor, the CMAT equipment to execute an initial five-axis lens alignment check that measures an initial MTF performance for the first lenses when dry-fit assembled with the camera components, and determining, by the processor, whether the initial MTF performance for the first lenses satisfies a MTF threshold. The method further includes, responsive to determining that the initial MTF performance for the first lenses does not satisfy the MTF threshold, further controlling the CMAT equipment to: use a set of second lenses that are loaded into the CMAT equipment for producing the portion of the final camera assembly with the camera components, compute a rotation to apply to the first lenses for use in producing a portion of another final camera assembly with different camera components, and store the first lenses within the CMAT equipment such that the portion of the other final camera assembly includes the first lenses with the rotation applied.

The techniques described herein, including any described process or method, may be performed by hardware or a combination of hardware and software executing thereon. For example, a computer-readable storage media may have instructions stored thereon and that when executed configure a processor to perform the described processes, methods, and techniques. A system may include means for performing the described methods, processes, and techniques. A processor or processor unit may be part of a system that is configured to execute the methods, processes, and techniques described herein.

This summary is provided to introduce aspects to actively select lenses for camera focus processes, which is further described below in the Detailed Description and Drawings. This summary is not intended to identify essential features of claimed subject matter, nor is it intended for use in determining scope of claimed subject matter.

BRIEF DESCRIPTION OF THE DRAWINGS

Details to actively select lenses for camera focus processes are described in this document with reference to the Drawings that may use same numbers to reference like features and components and hyphenated numbers to designate variations of these like features and components. The Drawings are organized as follows:

FIGS. 2-1, 2-2, and 2-3 illustrate conceptual diagrams of ways to focus a camera assembly based on lens position and/or orientation relative to an image sensor, in accordance with techniques of this disclosure;

FIG. 3 illustrates a flow diagram of an existing computer-controlled process to focus a camera assembly without actively selecting lenses in accordance with techniques of this disclosure;

FIGS. 4-1 and 4-2 illustrate a flow diagram of a computer-controlled process to focus a camera assembly by actively selecting lenses in accordance with techniques of this disclosure;

FIGS. 5-1 and 5-2 illustrate a flow diagram of another computer-controlled process to focus a camera assembly by actively selecting lenses in accordance with techniques of this disclosure; and FIGS. 6-1, 6-2, and 6-3 illustrate details of incorporating rotation into actively selecting lenses in accordance with techniques of this disclosure.

DETAILED DESCRIPTION

Introduction

Figure 1:
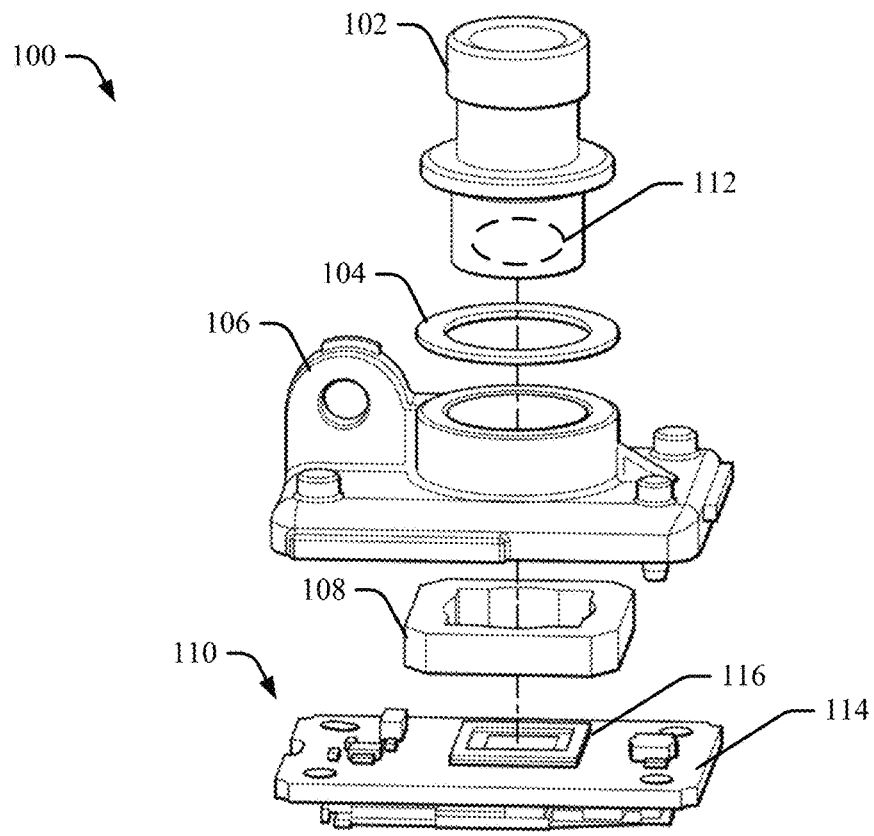
FIGS. 1-1 to 1-4 illustrate conceptual views of an example camera assembly for which lenses can be actively selected for camera focus processes, in accordance with techniques of this disclosure.

Using high quality lenses or other high quality components does not guarantee a high quality camera. Proper camera assembly is important to ensure a desired MTF, which enables high quality imaging. Finding ways to produce high quality camera assemblies, with less waste and in less time, can reduce costs, which allows their adoption by more vehicles for improved driving and safety. A high quality camera assembly may minimize corner to corner image variation while maintaining balance between center and corner image values and/or ensure quality camera focus to maintain image quality over long term use. High quality camera assemblies that include these and other characteristics are desired for vehicle use.

To achieve high quality, care is taken in selecting components for a camera assembly. Checking and selecting lenses for proper functionality can be a complex and time intensive task. For example, lenses can be checked through a process called dry-fit testing. Each lens is checked using a common test fixture, which simulates a production lens barrel and a production printed circuit board (PCB) assembly of a production camera assembly. The test fixture is input to a test machine, such as CMAT equipment, which executes a computer-controlled check of the lens focus ability when positioned within the test fixture. This process requires the CMAT to be manually loaded (e.g., by an operator) each time with the camera components (e.g., a lens assembly) under test. It is common for nearly one third of lenses to fail this dry-fit testing. Lenses that pass this check are permitted to be used in final assemblies. Lenses that fail are discarded or returned to manufacturers. Often times, results of dry-fit testing do not correlate with data from a lens supplier. Dry-fitting lenses prior to camera production or final assembly can maximize a chance that a camera assembly out of production satisfies requirements of the EOLT.

The EOLT checks each final camera assembly ultimately produced with the lenses that pass the initial CMAT tests. While the CMAT checks the lens performance against minimum requirements established by the EOLT, merely passing dry-fit with the CMAT is not a guarantee of passing the EOLT. Variances within production lens barrels or production PCB assemblies, when compared to the test fixture, can cause some camera assemblies to fail to meet EOLT requirements despite satisfying CMAT checks. In final assembly, there may be shifts in lens orientation, PCB mounting to the lens barrel, PCB variation, and pallet variation. Production variations in lens position and/or orientation (e.g., tilt-orientation, height-orientation) can degrade MTF and cause failures when ultimately tested at the EOLT.

Failures at the EOLT cannot be recovered; entire camera assemblies may be scrapped if they fail to meet the minimum requirements of the EOLT. The camera components, including the PCB components, cannot be saved if the EOLT fails; replacement components can be very expensive and difficult to obtain. Achieving consistent production of camera assemblies is difficult if final camera assemblies and their internal components are forced to be scrapped at a high rate.

This document describes techniques to actively select lenses for camera focus processes. Rather than manually pre-sorting lenses prior to production using CMAT equipment to dry-fit test them against a common test fixture, the described techniques involve actively selecting each set of lenses to be used during final assembly based on whether their pairing with a specific set of production components can satisfy MTF performance criteria of an EOLT. For example, as part of the camera assembly process, CMAT equipment may be loaded with lenses, lens barrels, and other camera components to assemble a camera assembly. The CMAT equipment can check a set of lenses that are dry-fit aligned to a particular set of production components. If minimum MTF performance cannot be achieved by their pairing, then the lenses are not used to complete that camera assembly; instead, a different set of lenses that have been loaded into the CMAT equipment is dry-fit aligned with that particular set of production components to produce a final camera assembly for the EOLT. This way, because the lenses are actively selected during production to achieve satisfactory MTF performance with the actual production components of that final camera assembly, each final camera assembly is likely to pass the EOLT focus check, thereby improving production output.

In some examples, when lenses fail the MTF performance check they are simply discarded. For example, the lenses are removed from the CMAT equipment if more than two corner MTF performance checks or the center MTF performance check do not satisfy MTF performance requirements. However, in certain situations, the lenses are salvageable via rotation applied by the CMAT equipment. To do this, advanced CMAT equipment that can apply rotation to lenses and store the rotated lenses for subsequent use in assemble, is used. By rotating a previously failed set of lenses in a particular way, they may satisfy MTF performance criteria for another camera assembly, which uses a different set of production components. For instance, if at least two corner positions and the center target position satisfy MTF performance, then a set of lenses may be rotationally salvageable. After applying a rotation to the lenses, they can be tried by the CMAT equipment with another camera assembly. The advanced CMAT equipment can install the lenses with this different rotation; existing CMAT equipment cannot accomplish this movement. To prevent too many salvage attempts with a particular set of lenses, a maximum number of attempts to rotationally fix a set of lenses can be observed. If the MTF performance checks fail two times, e.g., after computing and applying two rotations, the lenses may be discarded rather than be rotated again and again, possibly without ever having success.

Example Camera Assembly

FIGS. 1-1 to 1-4 illustrate conceptual views of an example camera assembly for which lenses can be actively selected for camera focus processes, in accordance with techniques of this disclosure. In FIG. 1-1, an exploded view of a camera assembly 100 is shown. The camera assembly 100 is formed of multiple parts, including a lens barrel 102 configured to hold one or more lenses 112, an adhesive material 104 configured to bond the lens barrel 102 to a housing 106 to provide structure and environmental protection to components of the camera assembly 100, and a gasket 108 configured to join the housing 106 to a PCB assembly 110, which includes an image sensor 116 arranged on a PCB 114.

Figures 1, 2:
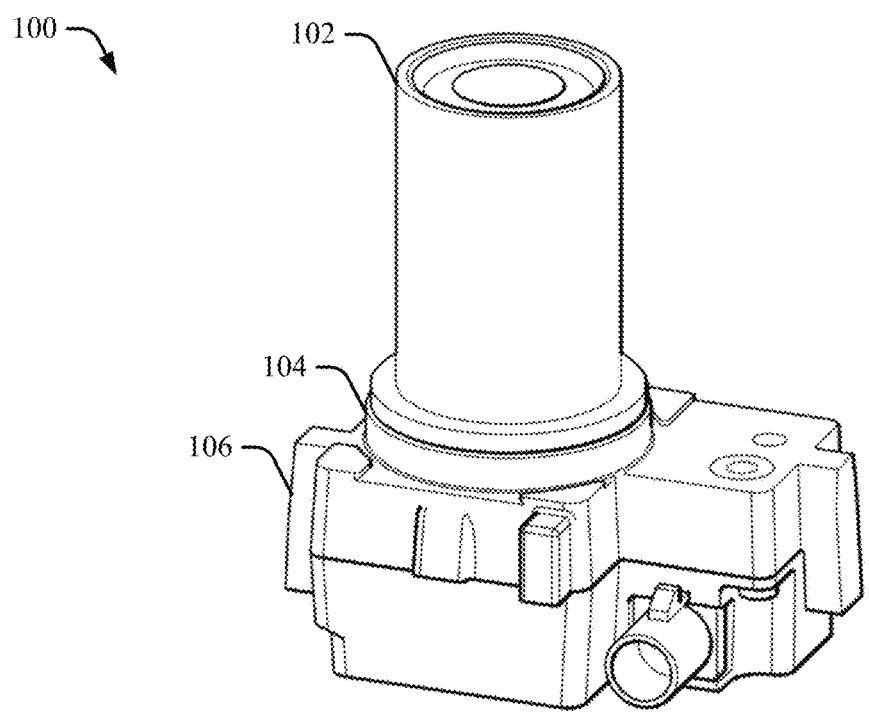

FIG. 1-2 shows an assembled view of the camera assembly 100 with the multiple parts arranged in a finally assembled manner. The lens barrel 102 is partially inserted into an opening of the housing 106. When cured, the adhesive material 104 fixes the lens barrel 102 to the housing 106, which in combination with the gasket 108, protects components of the PCB assembly 110 arranged within.

Figures 1, 2, 3:
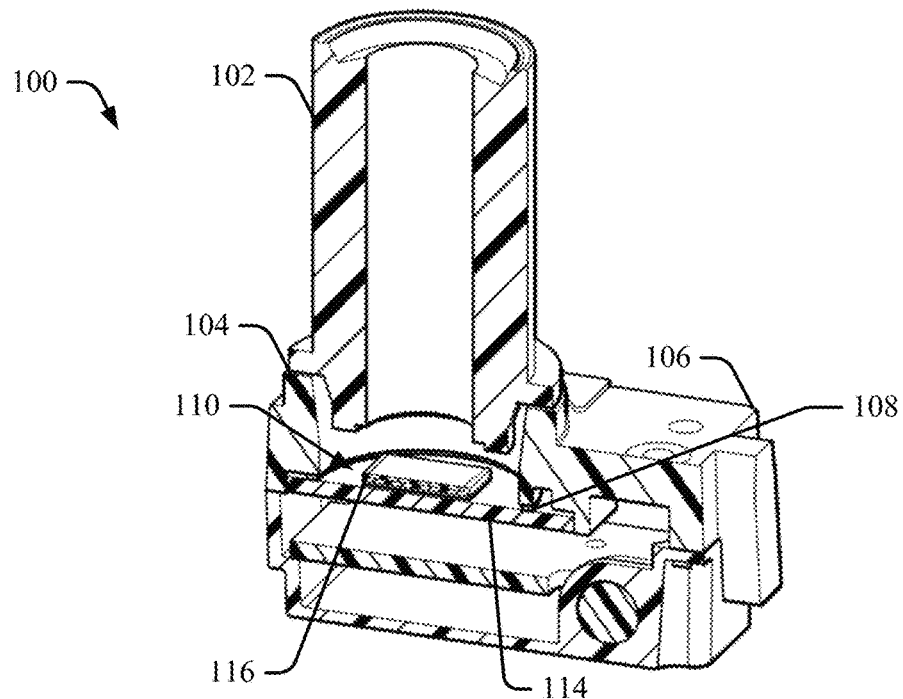

FIG. 1-3 illustrates a cross sectional view of the camera assembly 100. Within the lens barrel 102, one or more lenses 112 (e.g., a lens assembly) are stacked above the PCB assembly 110. The PCB assembly 110 includes the PCB 114 and, among the components on the PCB 114, the PCB assembly 110 includes the image sensor 116 (e.g., an imager). The lenses 112 are positioned over the image sensor 116 and a processing unit (e.g., hardware and/or software) executing on the PCB 114 controls the image sensor 116 for capturing images in a field of view.

FIG. 1-4 shows a close up cross-sectional view of the camera assembly 100. The lens barrel 102 includes the lenses 112, which are positioned above the image sensor 116 on the PCB 114 of the PCB assembly 110. The lens barrel 102 is adhered to the housing 106 with the cured adhesive material 104. The lens barrel 102 may have filters attached (e.g., an infrared filter). The gasket 108 seals the lens barrel 102 (including any filters) within the housing 106.

It is important that the components of the camera assembly 100 are fitted and assembled with precision. Otherwise, the camera assembly 100 may fail at the EOLT. If the camera assembly 100 fails the EOLT, it cannot be recovered and the entire camera assembly 100 may be scrapped. The image sensor 116, the PCB 114, the lenses 112, the gasket 108, the housing 106, the adhesive material 104, and the lens barrel 102 may be wasted if the camera assembly 100 is unable to pass the EOLT, which results in considerable waste of time and resources. Obtaining replacement components to build new replacement camera assemblies for those that fail can be difficult and expensive; many of these components are expensive or in short supply. Ensuring precise assembly and matching of components for the camera assembly 100 prior to EOLT may ensure the camera assembly 100 passes, which is important to achieving consistent production output with a low scrap rate.

Lens Positioning for Improved MTF

FIGS. 2-1 to 2-3 illustrates conceptual diagrams of ways to focus a camera assembly based on lens position and/or orientation relative to an image sensor. In each of the FIGS. 2-1 to 2-3, the lenses 112 of the camera assembly 100 are illustrated at different positions and orientations relative the image sensor 116 and the PCB 114.

FIG. 2-1 shows a scenario 200-1 in which an amount of tip or tilt associated with the lenses 112 can affect focus and MTF performance to produce an image 202-1, 202-2, or 202-3. In the scenario 200-1, the lenses 112 are oriented above the image sensor 116 at different angles of tilt with respect to a Z-axis that is perpendicular to an XY plane corresponding to the surface of the image sensor 116. The image 202-1 is somewhat out of focus when the lenses 112 are oriented with zero tilt or tip with respect to the image sensor 116. In contrast, with a positive tilt relative the Z-axis, the lenses 112 cause the image 202-2 to appear more out of focus than the image 202-1. However, with a negative tilt relative the Z-axis, the lenses 112 cause the image 202-3 to come into focus more than either of the images 202-1 or 202-2.

A different scenario 200-2 is shown in FIG. 2-2 in which an amount of separation between the lenses 112 and the image sensor 116 is also shown to alter focus and MTF performance to generate an image 202-4, 202-5, or 202-6. The lenses 112 are oriented above the image sensor 116 at a first distance from the surface of the image sensor 116, and the image 202-4 is out of focus. When the lenses 112 are oriented above the image sensor 116 at a shorter distance from the surface of the image sensor 116 than the first distance, and the image 202-5 is even more out of focus than the image 202-4. However, at a second position above the imager, which is not as far as the first distance and not as near as the shorter distance, the lenses 112 cause the image 202-6 to appear in focus.

A third scenario 200-3 is depicted in FIG. 2-3. The scenario 200-3 shows how an offset between a centerline 204 of the lenses 112 and the image sensor 116 can affect focus and MTF performance in producing an image 202-7, 202-8, or 202-9. In the scenario 200-3, the lenses 112 are oriented above the image sensor 116 at a first distance offset from the image sensor 116, and the image 202-7 is missing a portion 206-1 of the field of view. When the lenses 112 are oriented above the image sensor 116 with the centerline 204 aligned to the image sensor 116 (e.g., zero offset), the image 202-8 is improved over the image 202-7, however, still a portion 206-2 is omitted thereby restricting what is otherwise observable in the field of view. However, with a smaller offset between the centerline 204 of the lenses 112 and the image sensor 116, the lenses 112 cause the image 202-9 to capture the entire field of view without omitting either of the portions 206-1 or 206-2 that are omitted from the images 202-7 and 202-8.

The scenarios 200-1 to 200-3 demonstrate that positioning and orientation of the lenses 112 relative the image sensor 116 are important to ensure adequate focus and satisfactory MTF for passing an EOLT. This also shows that when producing the camera assembly 100, small adjustments to orientation and positioning of the lenses 112 relative the image sensor 116 during assembly can greatly improve EOLT pass rate.

Existing Assembly Process without Actively Selecting Lenses

FIG. 3 illustrates a flow diagram of an existing computer-controlled process 300 to focus a camera assembly without actively selecting lenses as described in accordance with techniques of this disclosure. The process 300 is described in the context of FIGS. 1-1 to 1-4 and 2-1 to 2-2, as if being performed by test equipment, including at least one processor configured to execute the steps of the process 300 and/or means for performing the steps of the process 300.

The process 300 includes an initial lens sort step 302 followed by a subsequent camera production step 304. Within the lens sort step 302, lens storage 308 for subsequent production is preceded by a MTF check 306.

During the MTF check 306, the lenses 112 are individually checked for focus performance using CMAT equipment and a static test structure. For example, the lenses 112 are checked by moving the lenses 112 relative the image sensor 116, as depicted in the scenarios 200-1 to 200-3.

The static test structure is built to replicate the camera assembly 100, or portions thereof, for testing different batches of the lenses 112 for fit and function with production components in final assembly. Each set of the lenses 112 is manually loaded into the test structure (e.g., individually by an operator). The static test structure can be a production version of the camera assembly 100, except the lenses 112. The components of the test structure may be locked in-place (e.g., with adhesive, mechanical interfaces) although no adhesive is used for the lenses 112. Unlike a true production version of the camera assembly 100 in which the lenses 112 are fixed, the static test structure is configured to allow the lenses 112 to be removed and replaced from one test to the next.

The static test structure replicates an operating environment for the lenses 112 to enable the CMAT equipment to consistently check focus capability. Included with the static test structure can be a replica of at least a portion of the lens barrel 102 in which the lenses 112 under test are positioned. Beneath the lens barrel 102 is a replica of at least a portion of the PCB assembly 110, including the image sensor 116 and some or all of the PCB 114. Relative position between components of the static test structure can move during test, for example, to check the lenses 112 for improved or degraded MTF when at different positions or orientations relative to the image sensor 116. For example, the MTF check 306 can include repositioning or reorienting the lenses 112 as shown in FIGS. 2-1 to 2-3 to determine whether the lenses 112 are likely to satisfy MTF requirements when mated to production components during final assembly.

During the MTF check 306, the CMAT equipment tests each set of the lenses 112 loaded on the test structure against requirements for MTF performance that are determined by the EOLT. Considered a dry-fit check of the lenses 112, an outcome of the MTF check 306 can be used to separate the lenses 112 that do not satisfy minimum MTF performance requirements from the lenses 112 that pass the MTF check 306. For example, using a five-axis lens alignment pattern for the MTF performance test, an acceptable MTF performance measurement may be greater than seventy percent at the center $MTF\_0$ of the lenses 112, and acceptable MTF performances measurements at the corners $MTF\_1$ to $MTF\_4$ of the lenses 112 may be greater than fifty percent.

An outcome of the MTF check 306 is the lens storage 308 where the lenses 112 that pass the MTF check 306 are maintained until ready to be assembled and focused for production. The lens storage 308 may attempt to preserve the precise position and orientation of the lenses 112 as they were during the MTF check 306; this allows the same lens positioning or orientation to be applied to production of the camera assembly 100 to increase a likelihood the camera assembly 100 can survive scrutiny by the EOLT during the camera production step 304.

During the camera production step 304, plasma treatment 310 of components is followed by epoxy dispense 312, five-axis lens alignment 314, and lastly, ultraviolet curing 316 before undergoing EOLT 318. At this stage production components to build the camera assembly 100 are loaded into the CMAT equipment, including the lenses 112 and at least a portion of the housing 106, which contains the lens barrel 102 and the PCB assembly 110. The adhesive material 104 is also loaded into the CMAT equipment.

The plasma treatment 310 cleans any interface surfaces of components loaded into the CMAT equipment. The cleaning uses a plasma cleaning process.

The epoxy dispense 312 applies the adhesive material 104 to the interface between the lens barrel 102 and the PCB assembly 110 to configure the portion of the PCB assembly 110 that is responsible for interfacing with the lenses (e.g., the image sensor 116) to be operable when the lenses 112 are installed.

The five-axis lens alignment 314 includes positioning the lenses 112 within the lens barrel 102 and above the PCB assembly 110, and then stepping through the CMAT focus process until MTF requirements are met. For example, this process involves using the position and orientation measurements made during the lens sort step 302 to guide the repositioning and reorientating of the lenses during the CMAT check. If the MTF requirements are not satisfied after a maximum number of attempts, the lenses 112 and the housing 106, including the PCB assembly 110 and the lens barrel 102, are rejected and scrapped.

If the camera assembly 100 passes the five-axis lens alignment 314, then ultraviolet curing 316 is performed. Ultraviolet illumination at this stage is applied to the camera assembly 100 to harden the adhesive material 104 and retain the lenses 112 in place, relative the PCB assembly 110.

After curing, the EOLT 318 occurs. Each of the production camera assemblies is tested against the MTF requirements. If the camera assembly 100 fails testing here, the entire unit is discarded.

As such, the process 300 and other existing assembly processes that do not utilize the techniques of this disclosure for actively selecting lenses, have some drawbacks or limitations. The lens sort step 302 is labor and time intensive (e.g., which increases manufacturing costs), however, to the camera production step 304, it is an important condition because it can minimize waste. Often, measurements performed by a manufacturer of the lenses 112 do not correlate with expected MTF performance that is measured during the MTF check 306, the five-axis lens alignment 314, or the EOLT 318. Without sorting, the process 300 may result in a high rate of unusable camera assemblies, or unusable portions thereof. Even so, because of variations in test structures and production components, the lens sort step 302 may not be a reliable way to obtain high quality camera assemblies at the camera production step 304 and wasted assemblies out of the EOLT 318 can be common. Obtaining replacement parts to manufacture further assemblies can be difficult, which may result in delays and an inconsistent rate and/or cost of production.

Example Assembly Processes Including Actively Selecting Lenses

Figures 1, 2, 3, 4:
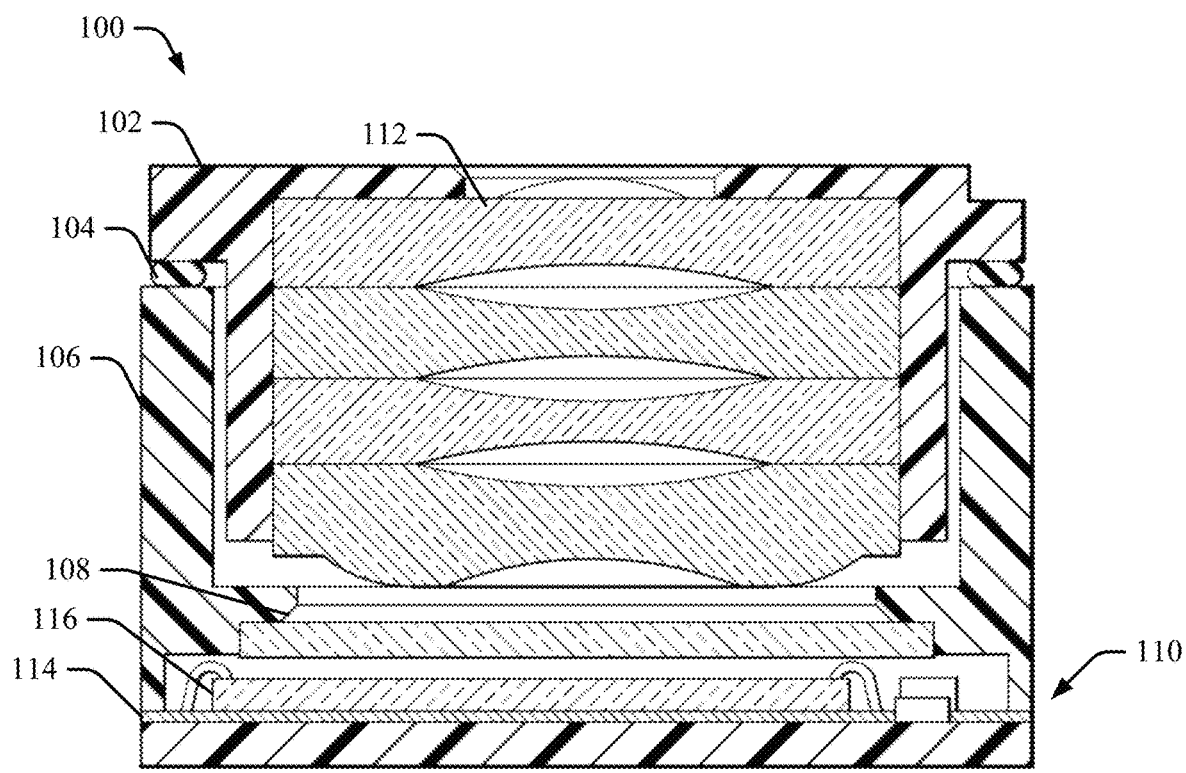
Figures 2, 3:
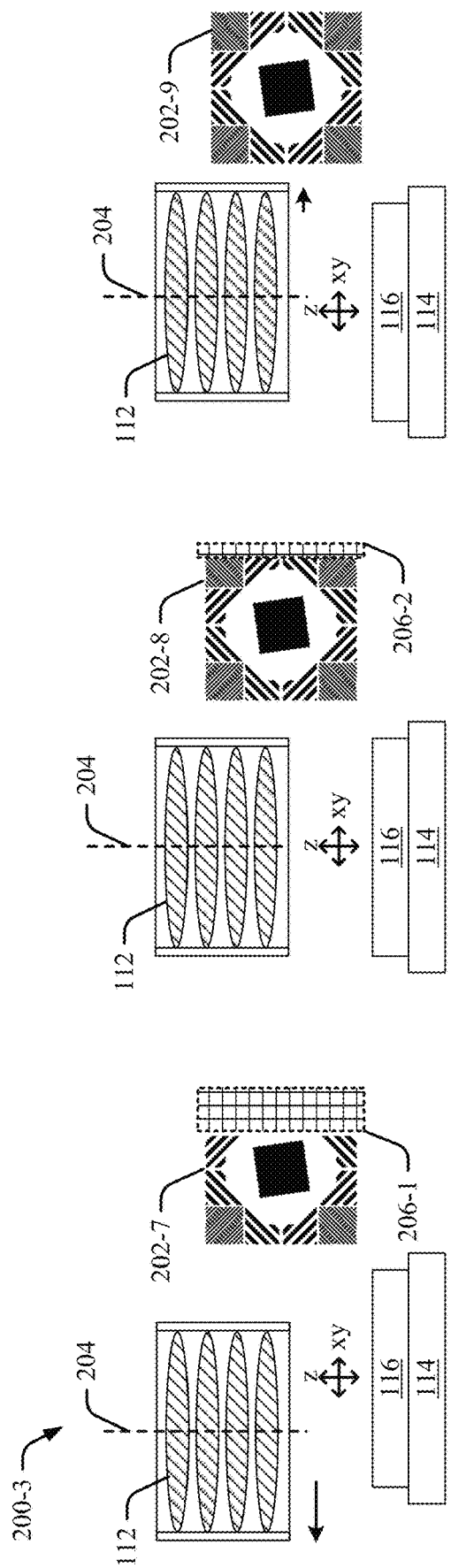
Figure 3:
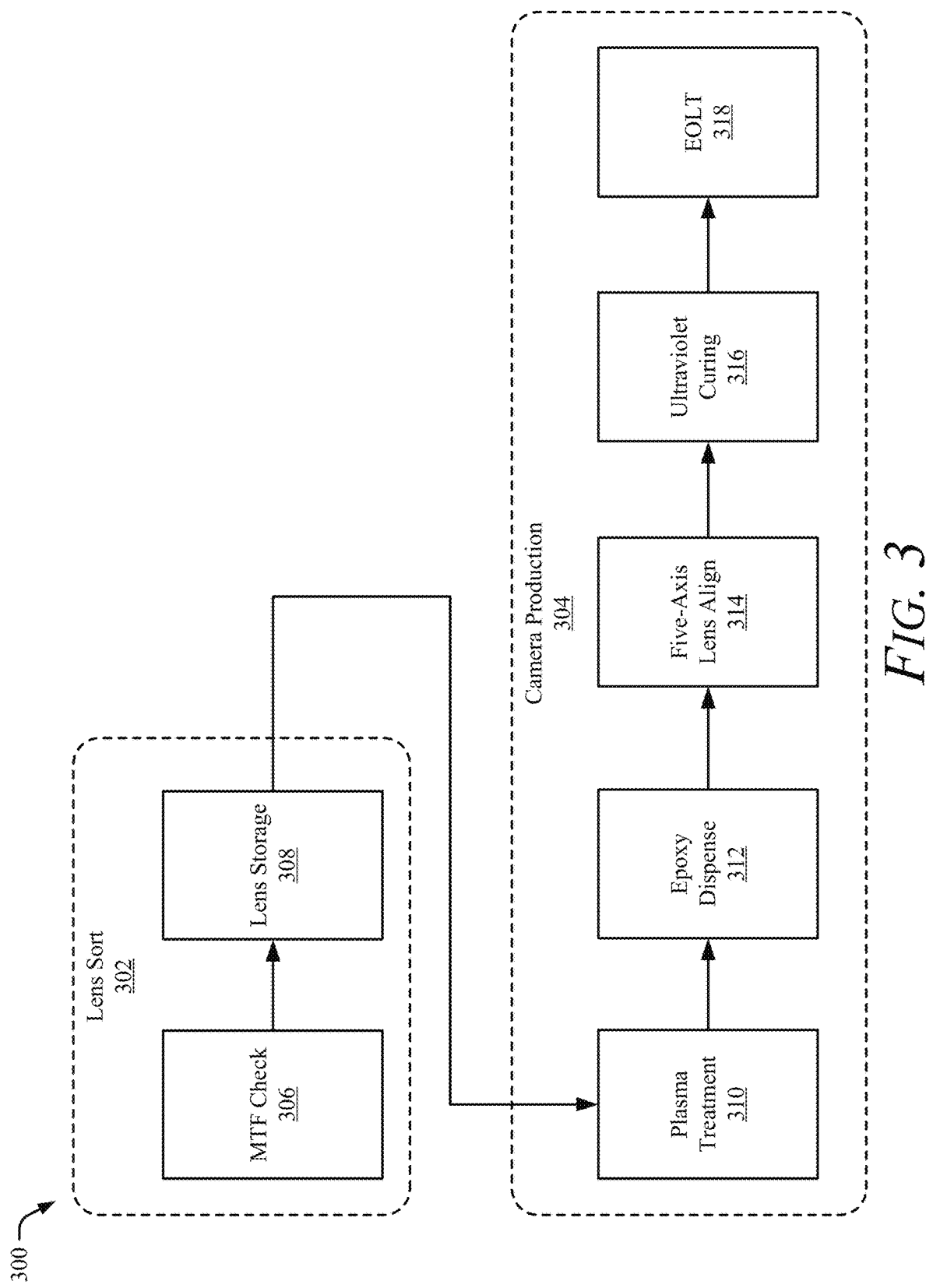
Figures 1, 4:
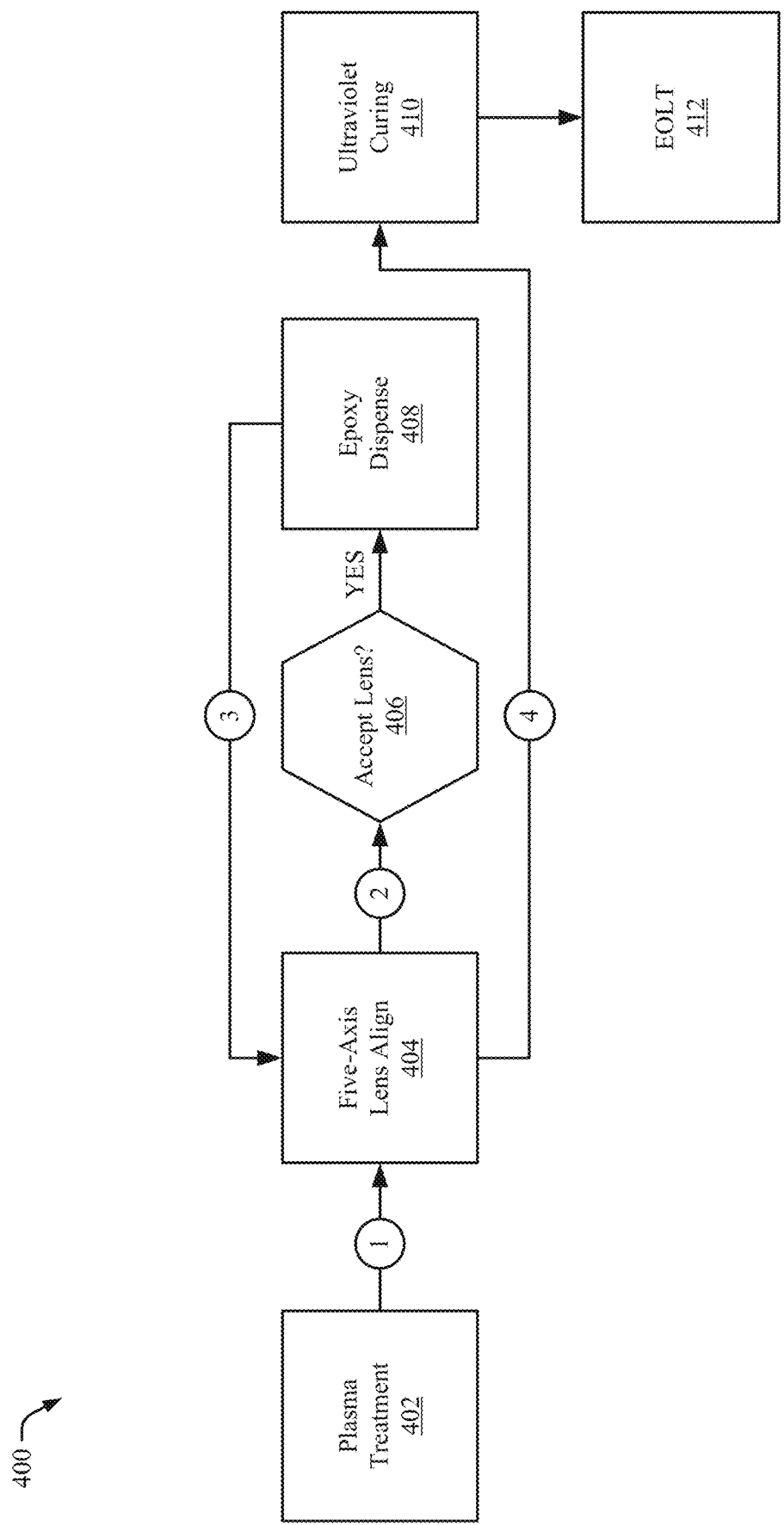
Figures 2, 4:
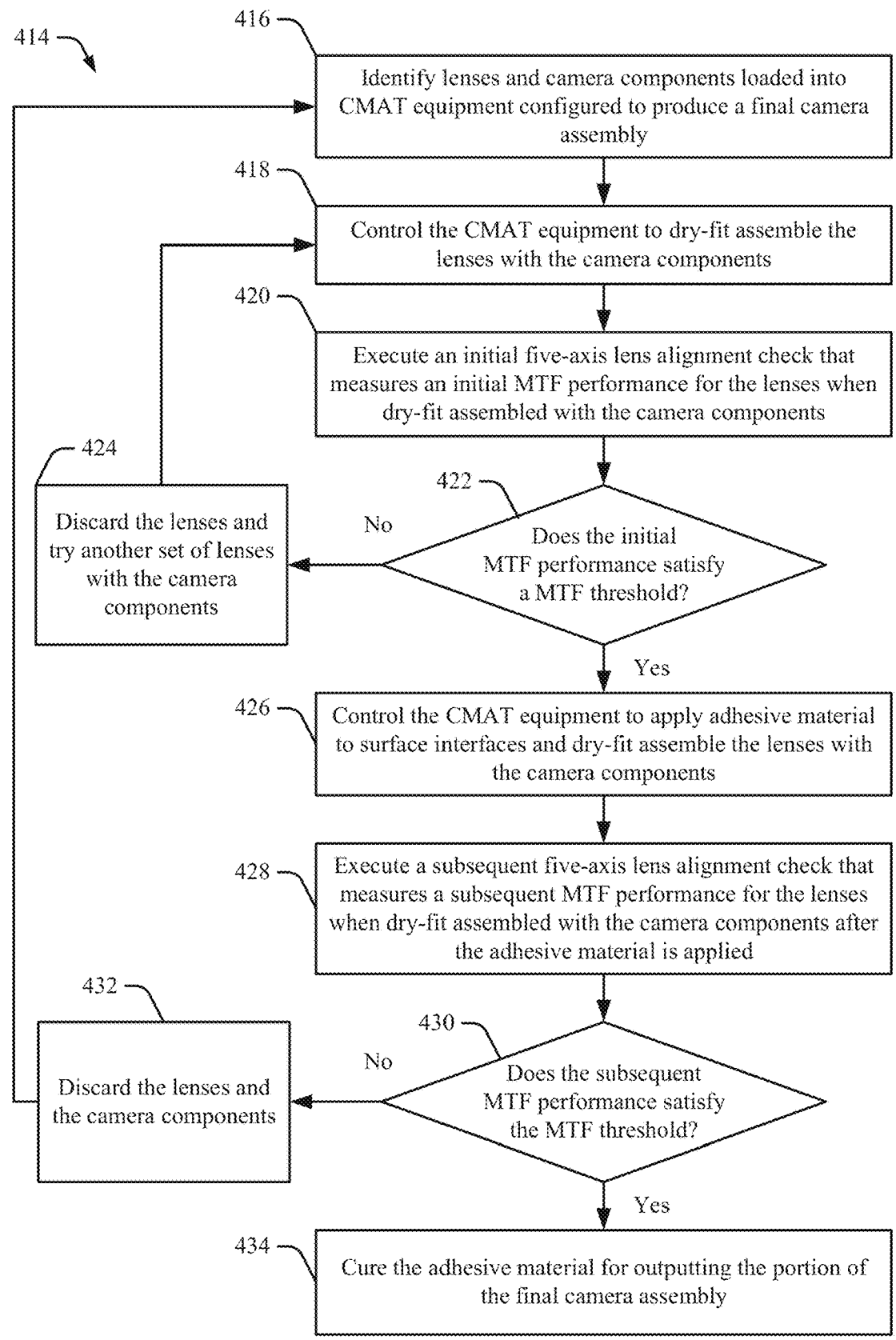

FIG. 4-1 illustrates a flow diagram of a computer-controlled process 400 to focus a camera assembly by actively selecting lenses in accordance with techniques of this disclosure. The process 400 is described in the context of FIGS. 1-1 to 1-4 and 2-1 to 2-3, as if being performed by test equipment, including at least one processor configured to execute the steps of the process 400 and/or means for performing the steps of the process 400. Operations (also referred to as steps) of the process 400 are numbered, however, this numbering does not necessarily imply a specific order of operations. The steps of the process 400 may be rearranged, skipped, repeated, or performed in different ways than the specific way it is shown in the diagram of FIG. 4-1.

The process 400 includes plasma treatment 402 followed by an initial, five-axis lens alignment 404. After the initial, five-axis lens alignment 404, a decision 406 is made regarding whether the lenses 112 are acceptable. If the lenses 112 are acceptable, epoxy dispense 408 precedes a subsequent, five-axis lens alignment 404. Then, ultraviolet curing 410 occurs before checking a final assembly at EOLT 412.

For example, similar to the camera production step 304, CMAT equipment can be loaded with production components to build the camera assembly 100. In other words, rather than pre-sorting lenses or camera components and manually loading them one at a time to check with a test fixture, the CMAT equipment can be loaded with multiple sets of camera components and multiple corresponding set of lenses. This can include loading multiple pallets of the lenses 112, portions of the housing 106, which contains the lens barrel 102 and the PCB assembly 110, as well as the adhesive material 104. The plasma treatment 402 cleans any interface surfaces of components loaded into the CMAT equipment. The cleaning uses a plasma cleaning process. Next, unlike in the process 300 in which the five-axis lens alignment 314 is preceded by the epoxy dispense 312, the five-axis lens alignment 404 of the process 400 occurs prior to applying any adhesive; the five-axis lens alignment 404 is a dry-fit.

At time 1, the five-axis lens alignment 404 may be performed by the CMAT equipment to measure the MTF performance of a particular set of the lenses 112, for installation in a production version of the camera assembly 100, using a particular lens barrel 102 and a particular PCB assembly 110. For example, the CMAT equipment loads a specific set of the lenses 112 into a specific, production version of the lens barrel 102 to check their combined focus capability when paired with a specific, production version of the PCB assembly 110 (or portion thereof). Then, the CMAT equipment is configured to reposition the lenses 112 and/or the lens barrel 102 relative the PCB assembly 110. Repositioning the lenses 112 and/or the lens barrel 102 can include adjusting a distance (e.g., height) separating the PCB assembly 110 and the lenses 112 and/or the lens barrel 102, adjusting an offset between corresponding centerlines of the PCB assembly 110 and the lenses 112 and/or the lens barrel 102, or adjusting an amount of tilt applied to the lenses 112 and/or the lens barrel 102 relative a detection plane of the PCB assembly 110. From performing the five-axis lens alignment 404 and testing different positioning and tilts of the lenses 112 to maximize MTF performance, a proper positioning and tilt angle of that set of lenses 112 relative that PCB assembly 110 can be inferred by the CMAT equipment.

The positioning and/or tilt of the lenses 112 can be incrementally adjusted during the five-axis lens alignment 404. Adjustments may start out having a large step-size (e.g., twelve microns). In response to obtaining satisfactory MTF performance by adjusting the position and/or tilt with large steps, the CMAT equipment can further adjust positioning and/or tilt with small steps, having a small step-size (e.g., four microns). This enables a best position and tilt of the lenses 112 to be determined, for that particular lens barrel 102 and that particular PCB assembly 110.

Next, at time 2, the decision 406 is made about whether the MTF performance of the lenses 112 in combination with the specific lens barrel 102 and the specific PCB assembly 110 satisfies the MTF requirements for final assembly. If minimum MTF performance is achievable during the five-axis lens alignment 404 (e.g., dry-fit), parameters for final assembly using the lenses 112 are stored. This includes storing the distance (e.g., height) between the lenses 112 and the PCB assembly 110, offset or orientation (e.g., tilt) of the lenses 112 relative the PCB assembly 110, among other parameters.

The lenses 112 that pass the decision 406 are accepted and proceed to the assembly stage using their parameters and matching lens barrels and PCB assemblies. The lenses 112 that do not satisfy the MTF performance requirements can be discarded. The five-axis lens alignment 404 may be repeated until MTF performance requirements are satisfied or a maximum number of adjustments or attempts is reached. Because the process 400 includes this dry-fit lens alignment check, there may be less waste of the lens barrel 102 and/or the PCB assembly 110 if the lenses 112 cannot be reoriented or repositioned with another set of production components, to achieve satisfactory MTF performance. If the lenses 112 are rejected, a different set of the lenses 112 can be tried with the lens barrel 102 and the PCB assembly 110.

The epoxy dispense 408 occurs based on the decision 406. The Lenses 112 are moved out of position and the CMAT equipment applies the adhesive material 104 to mating surfaces of the lens barrel 102 and/or the PCB assembly 110. The lenses 112 are reinstalled in the lens barrel 102, that is now mated to the PCB assembly 110. The lenses 112 are positioned and oriented relative the PCB assembly 110 using the proper positioning and tilt angle inferred from the five-axis lens alignment 404 that occurred earlier at time 1.

At time 3, the five-axis lens alignment 404 is performed again, however, because the lenses 112 can begin the alignment from the position and orientation inferred earlier, the five-axis lens alignment 404 may occur quicker than the five-axis lens alignment 404 that happens at time 1. The lenses 112 can be located above the PCB assembly 110 to perform the five-axis lens alignment and focus performance process. Fine adjustments to the position and orientation of the lenses 112 can occur to quickly step through the focus process until MTF requirements are achieved, or the maximum number of steps is reached. When the camera assembly 100 fails here, the lenses 112 and the components used to test the lenses 112 are rejected and scrapped. This may occur less frequently because the dry-fit of the components that occurred at time 1.

At time 4, if the camera assembly 100 passes the five-axis lens alignment 404, then ultraviolet curing 410 is performed. Ultraviolet illumination at this stage is applied to the camera assembly 100 to harden the adhesive material 104 applied to interfaces on surfaces of the camera assembly 100 during the epoxy dispense 408, e.g., to retain the lenses 112 in place with the lens barrel, relative the PCB assembly 110. After the ultraviolet curing 410, the EOLT 412 occurs. The camera assembly 100 is finally tested against the MTF requirements. If the final camera assembly 100 fails testing at the EOLT 412, then the entire unit is discarded.

As such, from using the CMAT equipment to actively select the lenses 112 likely to pass the MTF test, and ensure the components remain aligned before curing, the process 400 may result in less waste and take less time than other processes, such as the process 300. The process 400 may achieve significant reductions in production cost and time, and/or improvement in quality when compared to existing camera assembly techniques. The process 400 omits the labor and time intensive lens sort step 302, but still results in less waste and improved quality. The CMAT equipment checks MTF performance of the lenses 112 as part of the assembly process of the camera assembly 100; the lenses 112 are tested for focus capability with the specific production components that are to be used with the lenses 112. Compared to the process 300, the process 400 may result in a lower rate of unusable camera assemblies or a higher rate of usable camera assemblies, resulting in improved production quality.

FIG. 4-2 illustrates a flow diagram of a computer-controlled process 414 to focus a camera assembly by actively selecting lenses in accordance with techniques of this disclosure. The process 414 shows ways to actively select lenses for camera focus processes, including lenses to be used during camera assembly, which are chosen based on whether their pairing with a specific set of production components can satisfy focus performance criteria of end of line test. Test equipment may execute the process 414 to check the lenses by dry-fit aligning them to a particular set of production components. If minimum MTF performance cannot be achieved, then a different set of lenses are used with that set of production components to produce a final camera assembly. This way, because the lenses are actively selected during production to achieve satisfactory MTF performance of the EOLT, each final camera assembly is more likely to pass the EOLT coming out of the process 414, thereby improving camera production output.

The process 414 may be executed by a processor of CMAT equipment that is configured to control the CMAT equipment to produce a portion of a final camera assembly, such as the camera assembly 100. The processor may retrieve instructions that the CMAT equipment maintains in a memory or a computer-readable storage media. When executed, these instructions configure the processor to execute the process 414 by controlling components of the CMAT equipment, as described below.

At 416, lenses and camera components that have been loaded into CMAT equipment, which is configured to produce a final camera assembly, are identified. For examples, a processor of CMAT equipment may identify the lens barrel 102 and the PCB assembly 110 in addition to the lenses 112, each of which are loaded into the CMAT equipment for producing a portion of the camera assembly 100.

At 418, the CMAT equipment is controlled to dry-fit assemble the lenses with the camera components. For example, the processor of the CMAT equipment to causes components of the CMAT equipment to dry-fit assemble the lenses 112 with the camera components, including the lens barrel 102, the image sensor 116, the PCB 114, or other components of the camera assembly 100. No adhesive material or epoxy is used at this point.

At 420, an initial five-axis alignment check that measures an initial MTF performance for the lenses when dry-fit assembled with the camera components. For example, the processor of the CMAT equipment can execute a first dry-fit alignment (e.g., the five-axis lens alignment 404) that measures the initial MTF performance for the lenses 112 by changing a position or orientation of the lenses 112 or the camera components (e.g., the lens barrel 102, the PCB assembly 110) by causing course adjustments to the position or orientation of the lenses 112 or the camera components. The first dry-fit alignment can be followed by the processor of the CMAT equipment executing a second dry-fit alignment. The second dry-fit alignment measures the initial MTF performance for the lenses 112 by further changing the position or orientation of the lenses 112 or the camera components through fine adjustments to the position or orientation of the lenses 112 or the camera components. Each of the fine adjustments is a smaller amount of adjustment than each of the course adjustments. Alignment parameters resulting from the second dry-fit alignment including the position or orientation of dry-fit assembled lenses and camera components that achieves the MTF performance to satisfy the MTF threshold may be maintained by the processor of the CMAT equipment, before the adhesive material 104 is applied.

In some examples, the processor of the CMAT equipment maintains alignment parameters of the dry-fit assembled lenses 112 that satisfy the MTF threshold as an outcome of the step 420. These alignment parameters can include a height for the lenses 112 relative an image sensor 116 of the camera components and a degree of tilt relative the lenses 112 and the image sensor 116. The alignment parameters can be used by the processor to execute the subsequent five-axis lens alignment check at the step 428.

Although not shown for simplicity, in some examples, the processor controls the CMAT equipment to execute the initial five-axis lens alignment check after first controlling the CMAT equipment to clean the interfaces on the surfaces of the camera components prior to dry-fit assembling the lenses with the camera components. For example, the processor may cause the plasma treatment 402 to occur prior to step 420.

At 422 whether the initial MTF performance satisfies a MTF threshold is determined. For example, a No outcome from the step 422 causes the lenses to be discarded and another set of lenses to be tried with the camera components 424. A Yes outcome from the step 422 causes the lenses 112 to be used for producing the final camera assembly 100 by executing the step 426.

At 424, responsive to determining that the initial MTF performance for the lenses does not satisfy the MTF threshold, the processor can discard the lenses 112 from the CMAT equipment to prevent the lenses 112 from being used for producing portions of final camera assemblies. The process 414 returns to the step 418, where the processor controls the CMAT equipment to replace the lenses 112 with a second set of the lenses 112 for producing the final camera assembly 100.

At 426, responsive to determining that the initial MTF performance satisfies the MTF threshold, the processor can control the CMAT equipment to apply adhesive material to interfaces on surfaces of the camera components and to dry-fit assemble the lenses with the camera components after the adhesive material is applied. For example, the processor controls the CMAT equipment to apply the adhesive material 104 to the lens barrel 102 and the PCB 114, among other components of the PCB assembly 110.

At 428, a subsequent five-axis lens alignment check is executed that measures subsequent MTF performance for the lenses when dry-fit assembled with the camera components after the adhesive material is applied. For example, the processor of the CMAT equipment can execute a dry-fit alignment, with the adhesive material 104 applied, (e.g., the five-axis lens alignment 404) that measures the initial MTF performance for the lenses 112 by changing a position or orientation of the lenses 112 or the camera components (e.g., the lens barrel 102, the PCB assembly 110) by causing course and/or fine adjustments to the position or orientation of the lenses 112 or the camera components.

In cases where the alignment parameters resulting from the initial five-axis alignment executed at the step 420 can be used in this subsequent five-axis lens alignment. The alignment parameters can include the previously successful position or orientation of the dry-fit assembled lenses 112 and camera components able to achieve the MTF performance before the adhesive material 104 is applied. When input to the subsequent five-axis alignment check, the alignment parameters may be used as an initial settings for stepping through positional or orientational adjustments to the dry-fit assembled lenses 112 and camera components to quickly achieve the MTF performance for the final assembly, after the adhesive material is applied.

At 430, whether the subsequent MTF performance satisfies the MTF threshold is determined. For example, the processor of the CMAT equipment checks whether the result of the step 428 satisfies the MTF threshold for final production. A No outcome from step 430 results in step 432, and a Yes outcome proceeds to step 434.

At 432, responsive to determining that the MTF performance of the lenses 112 and the camera components does not satisfy the MTF threshold, the lenses and the camera components are discarded. For example, with the adhesive material applied to the camera components and the lenses 112, they are no longer suitable for reuse (e.g., without reconditioning or further cleaning) and are removed from the CMAT equipment.

Whereas, at 434, responsive to determining that the MTF performance of the lenses 112 and the camera components does satisfy the MTF threshold, the adhesive material is cured for outputting the portion of the final camera assembly. The adhesive material 104 fixes the lenses 112 with the lens barrel 102 and the PCB assembly 110.

In some cases, after causing the CMAT equipment to cure the adhesive material 104, the processor can check whether the subsequent MTF performance satisfies the MTF threshold, the process 414 further includes checking whether final MTF performance for the lenses 112 satisfies the MTF threshold. The portion of the final camera assembly 100 produced from the process 414 may be discarded. The processor may cause the CMAT equipment to refrain from outputting the portion of the final camera assembly for final production in response to determining that the final MTF performance for the lenses does not satisfy the MTF threshold.

Example Assembly Processes Including Actively Selecting Lenses and Rotation

Figures 1, 5:
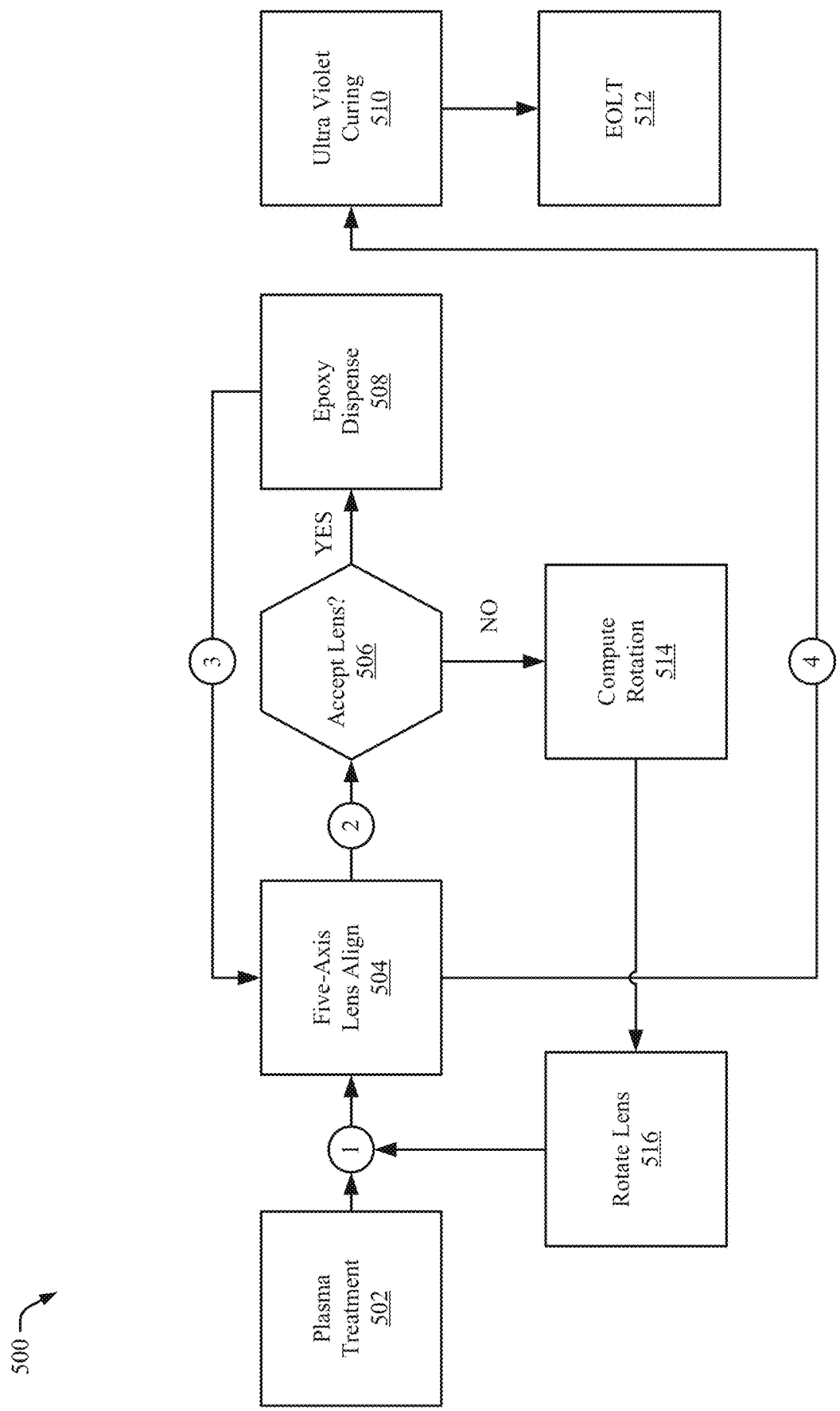
Figures 2, 5:
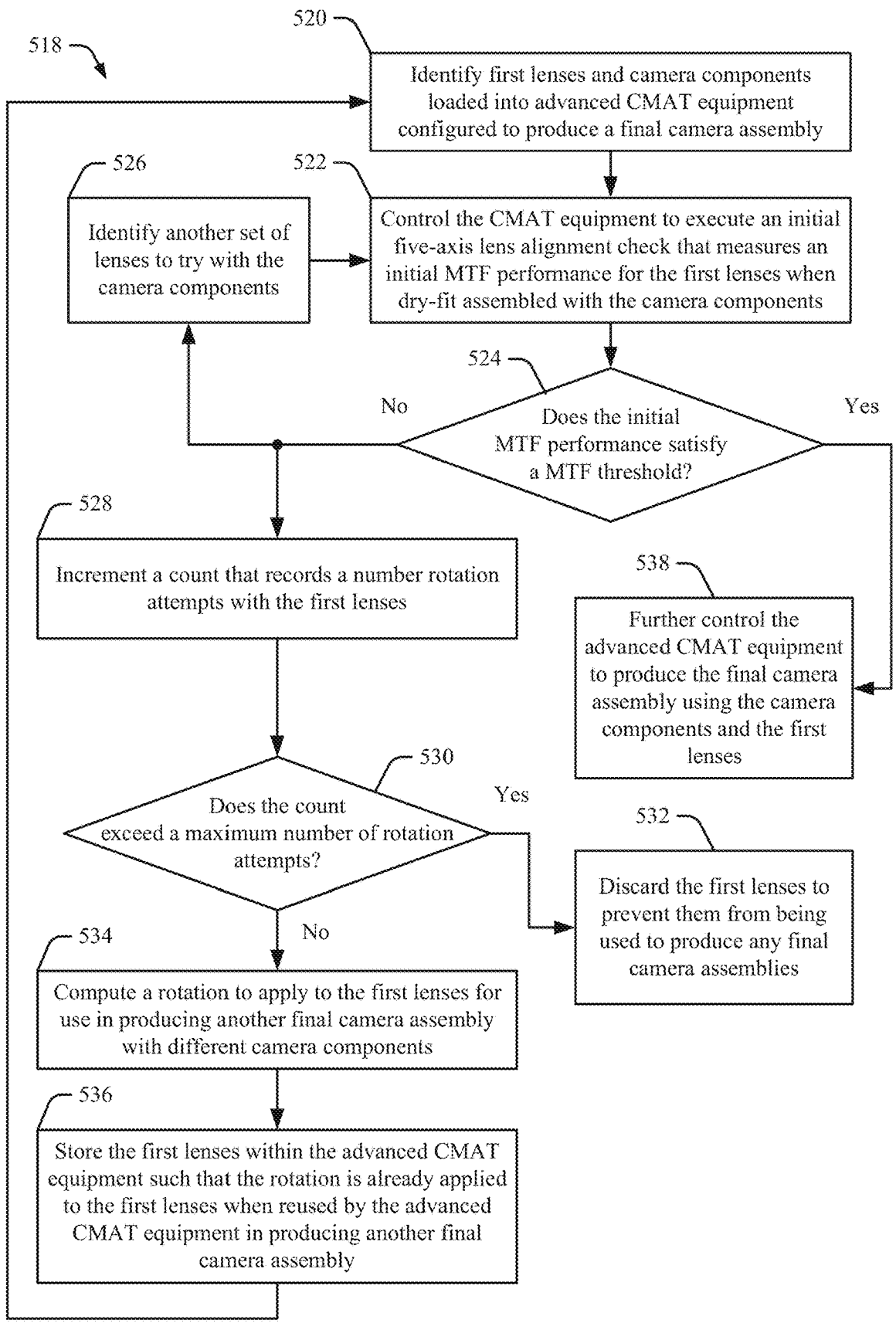

FIG. 5-1 illustrates a flow diagram of another computer-controlled process 500 to focus a camera assembly by actively selecting lenses in accordance with techniques of this disclosure. The process 500 builds off of the process 400 from FIG. 4-1 and can improve quality and reduce assembly failure rate even further. The process 500 is executed to maximize the chance that the camera assembly 100 can pass EOLT and output from production, with minimal time and waste. While existing CMAT equipment can execute the process 300 and/or the process 400, advanced CMAT equipment is used to execute the process 500. Instead of only being able to change angle of tilt, height, and/or lateral offset between the lenses 112 and the image sensor 116, the advanced CMAT equipment can also rotate the lenses 112 to change an angle of rotation between them and the image sensor 116. By utilizing the capabilities of advanced CMAT equipment to change lens rotation for a focus capability test, the process 500 can achieve higher camera quality and a lower production fail rate than even the process 400.

The process 500 includes some steps that are similar to the process 400, however, several of the steps are modified or new. The process 500 starts with plasma treatment 502. For example, the advanced CMAT equipment can be loaded with production components to build the camera assembly 100. This can include loading multiple pallets of the lenses 112, portions of the housing 106, which contains the lens barrel 102 and the PCB assembly 110, as well as the adhesive material 104. At this stage, the advanced CMAT equipment cleans interfaces between the components loaded into the system.

Next, at time 1, an initial five-axis lens alignment 504 is executed by the advanced CMAT equipment. MTF performance is tested for a particular set of the lenses 112, for installation in a production version of the camera assembly 100, using a particular lens barrel 102 and a particular PCB assembly 110. The positioning and/or tilt of the lenses 112 can be incrementally adjusted during the five-axis lens alignment 504. In response to obtaining satisfactory MTF performance by adjusting the position and/or tilt with large steps, the advanced CMAT equipment can further adjust positioning and/or tilt with small steps, having a small step-size. From performing the five-axis lens alignment 504 and testing different positioning and tilts of the lenses 112 to maximize MTF performance, a proper positioning and tilt angle of the lenses 112 relative the PCB assembly 110 can be inferred by the advanced CMAT equipment.

Next, at time 2, a decision 506 is made about whether the MTF performance of the lenses 112 in combination with the specific lens barrel 102 and the specific PCB assembly 110 satisfies the MTF requirements for final assembly. If minimum MTF performance is achievable during the five-axis lens alignment 504 (e.g., dry-fit), parameters for final assembly using the lenses 112 are stored. The lenses 112 that pass the decision 506 are accepted and used with their parameters and matching lens barrels and PCB assemblies to produce the camera assembly 100.

Some of the lenses 112 that do not satisfy the MTF performance requirements can be immediately discarded, as is done in the process 400 when the lenses 112 cannot satisfy MTF performance requirements. For example, if the minimum MTF output for a center target position is not met, the lenses 112 are immediately rejected and a new set of the lenses 112 is selected and tried with that combination of lens barrel 102 and PCB assembly 110.

Some of the lenses 112 may be salvaged if merely rotated to obtain satisfactory capability during a subsequent test with different camera components (e.g., a different lens barrel 102 and/or PCB assembly 110). If the minimum MTF output for the center target position is met, but the minimum MTF output for a corner target position is not met, then a process to apply rotation is executed out of the decision 506. That is, in response to the lenses 112 not passing the decision 506, the lenses 112 with acceptable center target position MTF performance undergo further testing, before being used again.

Figures 1, 6:
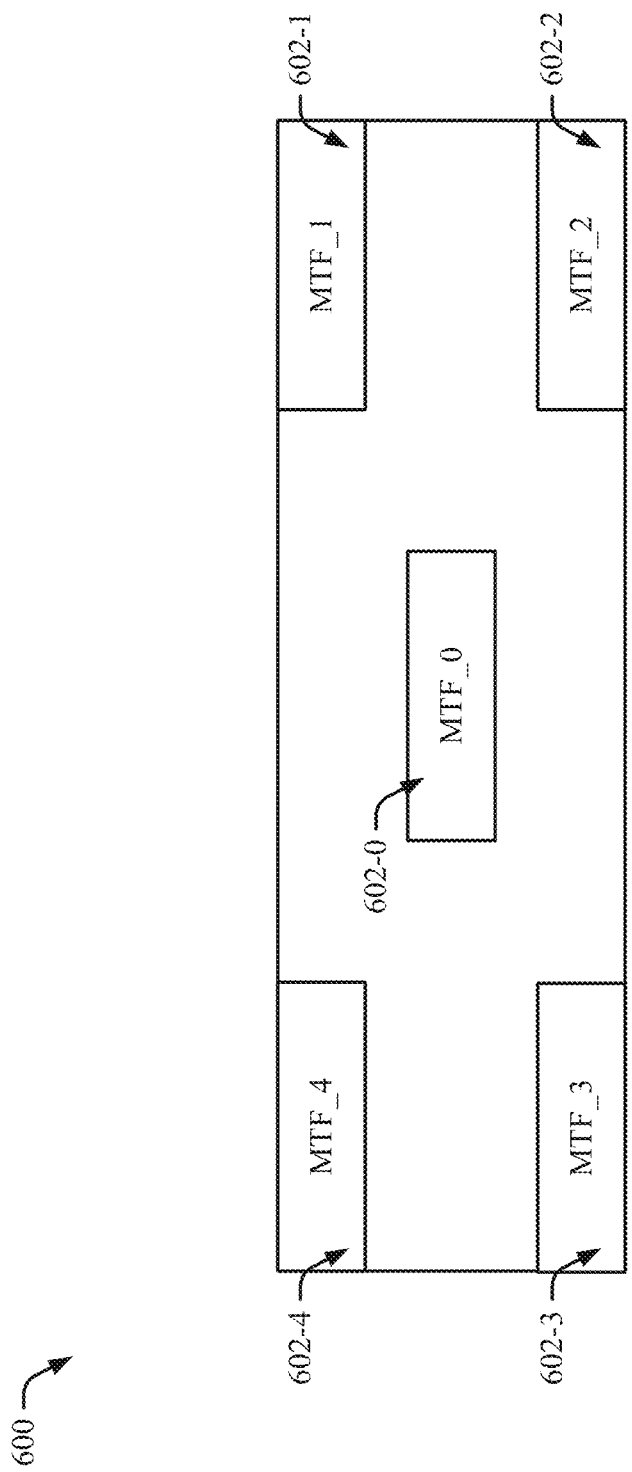
Figures 2, 6:
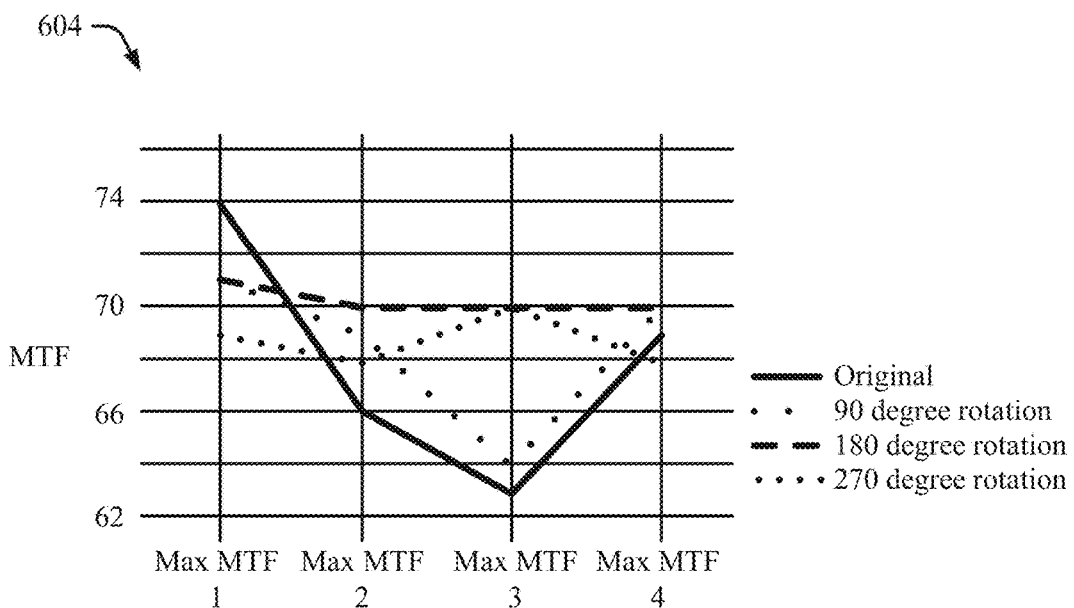
Figures 3, 6:
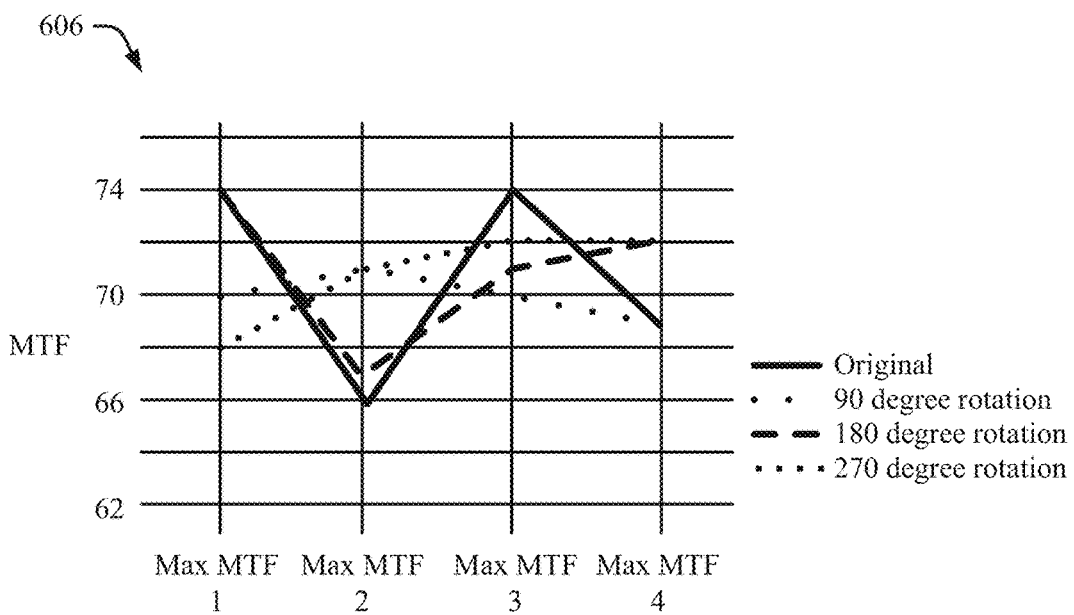

The advanced CMAT equipment that is configured to execute the process 500 includes additional components (e.g., circuitry, actuators, motors) to manipulate the rotation of the lenses 112 when reinstalled and reused with the lens barrel 102 during a subsequent dry-fit. Existing CMAT equipment is unable to rotate the lenses 112 this way. At 514, when the lenses 112 satisfy the center target position MTF but fail at one or more of the corner target positions, the advanced CMAT equipment is configured to compute rotation 514 to be applied to the lenses 112, in an attempt to improve the MTF performance when the lenses 112 are used next time. For example, using the MTF performance of different corner target positions, the advanced CMAT equipment can compute a best rotation of the lenses 112. The description of FIGS. 6-1 through 6-3 provide more details of this step and how the rotation is computed.

At 516, the advanced CMAT equipment is configured to rotate lens 516 according to the rotation computed at 514. For example, an arm rotates the lenses 112 based on a computed rotation amount and then the lenses 112 are returned to a pallet to be reused in another production of the camera assembly 100. Existing CMAT equipment is unable to execute the rotate lens 516 step of the process 500 and is why the advanced CMAT equipment is used. The rotation of the lenses 112 is preserved at 516, thereby increasing a likelihood of passing the MTF performance checks next time they are used to produce the camera assembly 100.

In some examples, the advanced CMAT equipment maintains a counter (e.g., zero to two), which is indexed each time a set of the lenses 112 is rotated, so that the lenses 112 are not attempted more than two or three times. However, even rotating the lenses 112 one or two times before discarding them can minimize waste and improve production quotas.

The epoxy dispense 508 occurs based on a positive outcome from the decision 506. At time 3, the five-axis lens alignment 504 is performed again. The lenses 112 can be located above the PCB assembly 110 to perform the five-axis lens alignment 504 and focus performance process. Fine adjustments to the position and orientation of the lenses 112 can occur to quickly step through the focus process until MTF requirements are achieved, or the maximum number of steps is reached. When the camera assembly 100 fails here, the lenses 112 and the components used to test the lenses 112 are rejected and scrapped. This may occur less frequently because the dry-fit of the components that occurred at time 1 and/or at 514 and 516.

At time 4, if the camera assembly 100 passes the five-axis lens alignment 504, then ultraviolet curing 510 is performed. Ultraviolet illumination at this stage is applied to the camera assembly 100 to harden the adhesive material 104 applied during the epoxy dispense 508 to retain the lenses 112 in place, relative the PCB assembly 110. After the ultraviolet curing 510, the EOLT 512 occurs. The camera assembly 100 is finally tested against the MTF requirements. If the final camera assembly 100 fails testing at the EOLT 512, then the entire unit is discarded.

As such, the techniques of this disclosure provide ways to actively select lenses for camera focus processes. Test equipment may check lenses by dry-fit aligning them to a particular set of production components. If minimum MTF performance cannot be achieved, then the lenses go unused for a final camera assembly. The unused set of lenses may be salvageable and usable in another camera assembly. Advanced CMAT equipment may compute and apply a rotation unused lenses to improve their MTF performance the next time they are used in a final assembly. A maximum number of attempts to rotationally fix a set of lenses may be observed to avoid trying the same lenses again and again, possibly without ever having success. This way, because the lenses actively selected can also be rotated during production, final camera assemblies can be produced that are likely to pass the EOLT, and by minimizing waste.

FIG. 5-2 illustrates a flow diagram of a computer-controlled process 518 to focus a camera assembly by actively selecting lenses in accordance with techniques of this disclosure. The process 518 shows ways to actively select lenses for camera focus processes, including applying a rotation if a set of lenses cannot achieve minimum MTF performance to be tried again in another assembly. The lenses are stored with a rotation to be used later, and a different set of lenses are used to complete the final assembly. The rotated lenses are then reused with another set of camera components, and because of the rotation, they may satisfy the MTF performance for producing another camera assembly. This way, because the lenses are actively selected and possibly rotated during production to achieve satisfactory MTF performance of the EOLT, each final camera assembly is more likely to pass the EOLT coming out of the process 518, thereby improving camera production output and minimizing waste (e.g., from discarding lenses rather than trying to rotate them first).

The process 518 may be executed by a processor of advanced CMAT equipment that is configured to apply a rotation to lenses stored within the CMAT equipment when the lenses fail during a five-axis alignment check. Unlike existing CMAT equipment, the advanced CMAT equipment includes motors, arms, actuators, and logic to enable repositioning of a set of lenses to have a different amounts of rotation relative an image sensor, when under an alignment test. The processor of the advanced CMAT equipment controls components of the advanced CMAT equipment produce a portion of a final camera assembly, such as the camera assembly 100. The processor may retrieve instructions that the advanced CMAT equipment maintains in a memory or a computer-readable storage media. When executed, these instructions configure the processor to execute the process 518 by controlling components of the advanced CMAT equipment, as describe below.

At 520, a set of camera components and a corresponding set of first lenses are identified, which are loaded into advanced CMAT equipment for producing a portion of a final camera assembly. For example, similar to the step 416 from the process 414, a processor of the advanced CMAT equipment identifies a first set of the lenses 112 and a production version of the lens barrel 102, and production versions of other camera components including the image sensor 116 and the PCB 114 to be used as the camera assembly 100.

At 522, the advanced CMAT equipment is controlled to execute an initial five-axis lens alignment check that measures an initial MTF performance for the first lenses when dry-fit assembled with the camera components. For example, similar to the steps 418 and 420 of the process 414, the processor controls the advanced CMAT equipment to dry-fit assemble the lenses 112 with the camera components before executing the initial five-axis alignment check to measure the MTF performance of the assembled parts.

At 524, whether the initial MTF performance satisfies a MTF threshold is determined. For example, the processor of the advanced CMAT equipment is configured to determine whether the initial MTF performance for the lenses satisfies a MTF threshold. A no outcome results in execution of the steps 526 and 528, whereas a Yes outcome from the step 524 proceeds to the step 538.

Take, for example, the case where the MTF performance of the lenses 112 does not satisfy the MTF threshold. At 526, another set of the lenses 112 to try with the camera components is identified. For example, the processor of the advanced CMAT equipment causes a different corresponding set of the lenses 112 to be paired with the lens barrel 102 and the PCB assembly 110 used previously. A different set of lenses that are loaded into the CMAT equipment are used instead. Because no adhesive is applied up to this point, the camera components, including the lenses 112, may be reused. Rather than immediately discard the lenses 112, the processor attempts to salvage the lenses 112 via rotation.

At 528, further responsive to determining that the initial MTF performance for the first lenses does not satisfy the MTF threshold, the CMAT equipment to increment a count that records a number of rotation attempts with the first lenses. For example, the processor of the advanced CMAT equipment stores a flag associated with the first lenses to indicate whether the first lenses exceed a maximum number of rotational corrections. The flag represents a count.

At 530, whether the count exceeds a maximum number of rotation attempts is determined. For example, if the flag and/or the count exceeds more than two rotational fixes, then the lenses 112 may not be suitable for attempted correction. A yes outcome from the step 530, results in the step 532 and a No outcome proceeds to the step 534.

At 532, responsive to determining that the first lenses exceed the maximum number of rotational corrections, the first lenses are discarded to prevent them from being used to produce any final camera assemblies. For example, the processor of the advanced CMAT equipment may cause the first lenses to be discarded from the CMAT equipment to prevent the first lenses from being used to produce another version of the camera assembly 100.

At 534, a rotation to apply to the first lenses is computed for use in producing a portion of another final camera assembly with different camera components. For example, as shown in relation to FIG. 6-1, the initial MTF performance for the first lenses includes a center MTF performance and four different corner MTF performances. The processor of the advanced CMAT equipment may initially determine whether minimum conditions for applying a rotation correction apply. If the minimum conditions, beyond the number of rotation attempts, are not satisfactory the processor can execute the step 532 to discard the lenses and prevent their use in any other final camera assembly.

A first condition includes center MTF performance. The processor may refrain from computing the rotation at the step 534 in response to determining that the center MTF performance does not satisfy a center MTF threshold. A second condition includes center MTF performance. The processor may refrain from computing the rotation at the step 534 in response to determining that the MTF performance of at least two of the four different corner MTF performances does not satisfy respective MTF thresholds. If either of these two conditions is not satisfied, the processor may execute the step 532 to discard the first lenses from the CMAT equipment to prevent the first lenses from being used to produce any portion of any final camera assembly. Next, which of the four different corners are associated with a highest MTF performance and which are associated with a lowest MTF performance, as well as a quantity of low performing corners is considered in computing the rotation at the step 534.

If only two of the four different corner MTF performances satisfy the respective MTF thresholds, the processor may determine a direction of the rotation based on a sequence of four corner positions including a sequence position of highest of the four different corner MTF performances relative a sequence position of lowest of the four different corner MTF performances. For example, as described in FIGS. 6-1 through 6-3, if the highest performing corners are sequentially positioned in a clockwise sequence, then a one hundred eighty degree rotation is applied. If the opposite is true, and the highest MTF performing corners are interspersed in the sequence with the lowest MTF performing corners, then a either a ninety degree (e.g., clockwise) or a negative ninety degree (e.g., counter-clockwise) rotation is appropriate. If the highest performing corner precedes the lowest performing corner in a clockwise sequence, then the rotation is positive or clockwise. If the opposite is true, and the lowest performing corner precedes the highest performing corner in the sequence, then a counter-clockwise or negative rotation is appropriate.

If three of the four different corner MTF performances satisfy respective MTF thresholds and only one of the MTF performances is low, than a different approach to computing the rotation is taken. For example, if only three of the four different corner MTF performances satisfy the respective MTF thresholds, the processor may determine a direction of the rotation based on a corner position of a highest of the four different corner MTF performances and a corner position of a lowest of the four different corner MTF performances. For example, if the highest and lowest performing corners are opposite a diagonal, then a one hundred eighty degree rotation may be appropriate. If the highest to lowest are ordered clockwise, then a ninety degree (e.g., clockwise) rotation is appropriate, and if the highest to lowest are ordered counter-clockwise, then a negative (e.g., counter-clockwise) rotation is applied.

At 536, store the first lenses within the CMAT equipment such that the portion of the other final camera assembly includes the first lenses with the rotation applied. For example, so the lenses 112 are usable during a subsequent assembly process, the processor controls the advanced CMAT equipment to return the lenses 112, with the rotation or with information to specify the rotation of the lenses 112, for a subsequent dry-fit and alignment check with other camera components. With the rotated lenses 112 returned for use again by the advanced CMAT equipment, the process returns to step 520.

When the step 520 is repeated for producing another final camera assembly with different camera components, a set of second camera components are loaded into the CMAT equipment for producing a portion of the other final camera assembly with the first lenses 112 that are stored with the rotation applied. The processor of the advanced CMAT equipment dry-fit aligns the rotated lenses 112 with a new lens barrel 102 and PCB 114. Then, the step 522 occurs, where the CMAT equipment is controlled to execute the initial five-axis lens alignment check that measures the initial MTF performance for the first lenses 112 when dry-fit assembled with the second camera components. Because the lenses 112 are rotated at step 534, the initial MTF performance for the first lenses 112, when dry-fit this time with different camera components, may satisfy the MTF threshold.

The process 518 continues to the step 524 to determine whether the initial MTF performance is satisfactory for final assembly. If not, the steps 528 and 526 are performed again. However, a Yes outcome from step 524 causes the lenses 112 to be used in final assembly.

At 538, responsive to determining that the other initial MTF performance for the first lenses satisfies the MTF threshold, the CMAT equipment is further controlled to use the first lenses for producing the portion of the other final camera assembly with the second camera components. This can include using alignment parameters maintained during the initial five-axis lens alignment at the step 522 to execute a subsequent five-axis lens alignment check with the first lenses and the second camera components. The alignment parameters include a height for the first lenses relative an image sensor of the second camera components and a degree of tilt relative the first lenses and the image sensor of the dry-fit assembled first lenses that satisfy the MTF threshold. When used for the subsequent five-axis lens alignment that occurs after adhesive material is applied, the check can occur faster because the course adjustments can begin from a best position computed prior to applying the adhesive material.

Example Compute Rotation

FIGS. 6-1 to 6-3 illustrate details of incorporating rotation into actively selecting lenses in accordance with techniques of this disclosure. FIGS. 6-1 to 6-3 are described in the context of the process 500 from FIG. 5.

FIG. 6-1 shows a lens target 600 for testing MTF performance of a set of the lenses 112. For example, during the five-axis lens alignment 504 the advanced CMAT equipment is configured to check focus capability relative target positions on the lens target 600, when the lens target is positioned in a field of view of the lens barrel 102 and the image sensor 116 that are under test. The lens target 600 is a rectangle and includes multiple target positions 602 arranged about the rectangle. MTF performance at each of the target positions 602 can uniquely depend on MTF performance at each other of the target positions 602. The target positions 602 each have a MTF performance that can be change (e.g., improve) through rotation of the lenses 112.

The target positions 602 include target position 602-0 through target position 602-4. The target position 602-0 is the center of the lens target 600. The target positions 602-1 to 602-4 are arranged at each of the corners of the lens target 600, including the target position 602-1 at the upper-right corner, the target position 602-2 at the lower-right corner, the target position 602-3 at the lower-left corner, and the target position 602-4 at the upper-left corner. In executing the five-axis lens alignment 504, the CMAT equipment manipulates the camera assembly 100 under test to check the MTF performance at each of the multiple target positions 602.

After the five-axis lens alignment 504, the decision 506 made whether to accept or reject the lens may be based on the MTF performance at the multiple target positions 602. For example, if the MTF performance at each of the target positions 602 satisfies a respective minimum MTF threshold for that target position, then the lenses 112 are used for production. However, if the MTF performance at any of the target positions 602 does not satisfy minimum MTF requirements, then the decision 506 is to reject the lenses 112 for use with the existing lens barrel 102 and remaining portion of the camera assembly 100. Instead, a different set of the lenses 112 are used.

At the compute rotation 514 step, the lenses 112 may be salvaged. Prior to rejecting the lenses 112 outright, the lenses 112 are checked to see if they can be improved through rotation. Generally, rotation can improve the MTF performance of the lenses 112 at each corner of the lens target 600 (i.e., the target positions 602-1 to 602-4). However, there are some situations when the MTF performance cannot be improved via lens rotation.

If the MTF performance of the lenses 112 at the center (i.e., the target position 602-0) does not satisfy a minimum MTF threshold, then the lenses 112 cannot be improved via rotation. In this case, the lenses 112 are immediately rejected and the rotate lens 516 is not attempted, regardless of the MTF performance at the corners of the lens target 600. Furthermore, if the MTF performance of the lenses 112 at more than two corner positions (i.e., at least three of the target positions 602-1 to 602-4) does not satisfy a minimum MTF threshold, then the lenses 112 also cannot be improved via rotation. The lenses 112 are immediately rejected and the rotate lens 516 is not attempted, regardless of the MTF performance at the center or remaining corner of the lens target 600.

If, however, the MTF performance of the lenses 112 at the center of the lens target 600 satisfies the minimum MTF threshold for the center position, and at least two corner positions satisfy the minimum MTF threshold, then the lenses 112 can possibly be improved via rotation. To perform the compute rotation 514 step, there may be two different conditions to consider.

A first condition is when two of the corners of the lens target 600 have insufficient MTF performance while the other corners of the lens target 600 have sufficient MTF performance. If two corners have lower MTF values and two corners have higher MTF values, an amount and direction of rotation for the lenses 112 to improve the low MTF values is dependent on a sequence of their relative positions.

For example, FIG. 6-2 shows a situation 604 when the two lower corners (i.e., the target positions 602-2 and 602-3) are sequential. For this case a rotation of one hundred eighty degrees may offer a most improved MTF performance. FIG. 6-3 below shows a situation 606 when the two lower corners are not sequential. For this case a rotation of positive or negative ninety degrees may improve MTF performance. The direction of rotation (i.e., positive or negative rotation) is dependent on which corner has a highest MTF performance relative a corner with a lowest MTF performance.

However, if only one of the corners needs to be improved, then the degree and direction of rotation is dependent of the relative positioning between the corner with the low MTF performance and the corner target with the highest MTF performance. If only one corner is low relative to the other corners; then the degree rotation is solely dependent on a relative location of the highest and lowest MTF performing corners. The degree or amount of rotation angle is indicated by the following guidance. If a highest MTF performing corner and a lowest MTF performing corner are arranged sequentially, counterclockwise, then the lenses 112 are to be rotated negative ninety degrees (i.e., ninety degrees counterclockwise). Else, if a highest MTF performing corner and a lowest MTF performing corner are arranged across from each other, on a diagonal of the lens target 600, then the lenses 112 are to be rotated one hundred eighty degrees. Lastly, if the highest MTF performing corner and the lowest MTF performing corner are arranged sequentially, clockwise, then the lenses 112 are to be rotated positive ninety degrees (i.e., ninety degrees clockwise).

Following the compute rotation 514 as described above, the rotate lens 516 occurs to apply the computed rotation to the lenses 112 being returned for use in another build of the camera assembly 100. In some cases, the advanced CMAT equipment maintains a variable associated with each of the lenses 112, indicating a quantity of rotation attempts resulting from the decision 506 to reject. In some case, each set of lenses 112 may only receive two rotation attempts. If a set of the lenses 112 results in the decision 506 to reject a third time, then the lenses 112 are rejected and no further attempts to salvage the lenses is tried.

FURTHER EXAMPLES

Some further examples in view of the techniques described above include:

Example 1. A method comprising: identifying, by a processor of camera modular alignment and test (CMAT) equipment, a set of camera components and a corresponding set of lenses that are loaded into the CMAT equipment for producing a portion of a final camera assembly; controlling, by the processor, the CMAT equipment to: dry-fit assemble the lenses with the camera components; and execute an initial five-axis lens alignment check that measures an initial modulation transfer function (MTF) performance for the lenses when dry-fit assembled with the camera components; determining, by the processor, whether the initial MTF performance satisfies a MTF threshold; and responsive to determining that the initial MTF performance satisfies the MTF threshold, further controlling the CMAT equipment to: apply adhesive material to interfaces on surfaces of the camera components; dry-fit assemble the lenses with the camera components after the adhesive material is applied; execute a subsequent five-axis lens alignment check that measures subsequent MTF performance for the lenses when dry-fit assembled with the camera components after the adhesive material is applied; and cure the adhesive material for outputting the portion of the final camera assembly if the subsequent MTF performance satisfies the MTF threshold.

Example 2. The method of example 1, further comprising: identifying a set of second camera components and a corresponding set of second lenses that are loaded into the CMAT equipment for producing a portion of a second final camera assembly; controlling, by the processor, the CMAT equipment to execute an initial five-axis lens alignment check that measures an initial MTF performance for the second lenses when dry-fit assembled with the second camera components; and responsive to determining that the initial MTF performance for the second lenses does not satisfy the MTF threshold, controlling, by the processor, the CMAT equipment to replace the second lenses with third lenses for the second final camera assembly.

Example 3. The method of any preceding example, further comprising: controlling, by the processor, the CMAT equipment to execute an initial five-axis lens alignment check that measures an initial MTF performance for the third lenses when dry-fit assembled with the second camera components; and responsive to determining that the initial MTF performance for the third lenses satisfies the MTF threshold, controlling, by the processor, the CMAT equipment to: dry-fit assemble the third lenses with the second camera components after second adhesive material is applied to interfaces on surfaces of the second camera components; and execute a subsequent five-axis lens alignment check that measures subsequent MTF performance for the third lenses when dry-fit assembled with the second camera components after the second adhesive material is applied; and cure the second adhesive material for producing the portion of the second final camera assembly if the subsequent MTF performance for the third lenses satisfies the MTF threshold.

Example 4. The method of any preceding example, further comprising: further responsive to determining that the initial MTF performance for the second lenses does not satisfy the MTF threshold, discarding the second lenses from the CMAT equipment to prevent the second lenses from being identified for producing portions of third final camera assemblies.

Example 5. The method of any preceding example, further comprising: further responsive to determining that the initial MTF performance satisfies the MTF threshold, maintaining, by the processor, alignment parameters of the dry-fit assembled lenses that satisfy the MTF threshold, wherein the alignment parameters are used by the processor to execute the subsequent five-axis lens alignment check.

Example 6. The method of any preceding example, wherein the alignment parameters comprise a height for the lenses relative an image sensor of the camera components and a degree of tilt relative the lenses and the image sensor.

Example 7. The method of any preceding example, wherein controlling the CMAT equipment to execute the initial five-axis lens alignment check comprises: executing a first dry-fit alignment that measures the initial MTF performance for the lenses by changing a position or orientation of the lenses or the camera components by causing course adjustments to the position or orientation of the lenses or the camera components; executing a second dry-fit alignment that measures the initial MTF performance for the lenses by further changing the position or orientation of the lenses or the camera components through fine adjustments to the position or orientation of the lenses or the camera components, each of the fine adjustments comprising a smaller amount of adjustment than each of the course adjustments; and maintaining alignment parameters resulting from the second dry-fit alignment including the position or orientation of dry-fit assembled lenses and camera components that achieves the MTF performance to satisfy the MTF threshold before the adhesive material is applied.

Example 8. The method of any preceding example, wherein controlling the CMAT equipment to execute the subsequent five-axis lens alignment check comprises: obtaining the alignment parameters resulting from the second dry-fit alignment; and controlling the CMAT equipment to execute a third dry-fit alignment that measures the subsequent MTF performance for the lenses when dry-fit assembled with the camera components after the adhesive material is applied, the third dry-fit alignment executed by using the alignment parameters as an initial settings for stepping through positional or orientational adjustments to the dry-fit assembled lenses and camera components that achieve the MTF performance to satisfy the MTF threshold after the adhesive material is applied.

Example 9. The method of any preceding example, wherein controlling the CMAT equipment to execute the initial five-axis lens alignment check comprises controlling the CMAT equipment to clean the interfaces on the surfaces of the camera components prior to dry-fit assembling the lenses with the camera components.

Example 10. The method of any preceding example, wherein after curing the adhesive material if the subsequent MTF performance satisfies the MTF threshold, the method further comprises: checking whether final MTF performance for the lenses satisfies the MTF threshold; and refraining from outputting the portion of the final camera assembly for final production in response to determining that the final MTF performance for the lenses does not satisfy the MTF threshold.

Example 11. A method comprising: identifying, by a processor of camera modular alignment and test (CMAT) equipment, a set of camera components and a corresponding set of first lenses that are loaded into the CMAT equipment for producing a portion of a final camera assembly; controlling, by the processor, the CMAT equipment to execute an initial five-axis lens alignment check that measures an initial modulation transfer function (MTF) performance for the first lenses when dry-fit assembled with the camera components; determining, by the processor, whether the initial MTF performance for the first lenses satisfies a MTF threshold; and responsive to determining that the initial MTF performance for the first lenses does not satisfy the MTF threshold, further controlling the CMAT equipment to: use a set of second lenses that are loaded into the CMAT equipment for producing the portion of the final camera assembly with the camera components; compute a rotation to apply to the first lenses for use in producing a portion of another final camera assembly with different camera components; and store the first lenses within the CMAT equipment such that the portion of the other final camera assembly includes the first lenses with the rotation applied.

Example 12. The method of any preceding example, wherein controlling the CMAT equipment to store the first lenses within the CMAT equipment comprises incrementing a flag associated with the first lenses to indicate whether the first lenses exceed a maximum number of rotational corrections.

Example 13. The method of any preceding example, further comprising: determining, based on the flag associated with the first lenses, whether the first lenses exceed the maximum number of rotational corrections; and responsive to determining that the first lenses exceed the maximum number of rotational corrections, discarding the first lenses from the CMAT equipment to prevent the first lenses from being used to produce any portion of any final camera assembly.

Example 14. The method of any preceding example, wherein the initial MTF performance for the first lenses comprises a center MTF performance and four different corner MTF performances, and further controlling the CMAT equipment to compute the rotation to apply to the first lenses comprises: determining whether the center MTF performance and at least two of the four different corner MTF performances satisfy respective MTF thresholds; and responsive to determining that the center MTF performance and at least two of the four different corner MTF performances do not satisfy the respective MTF thresholds: refraining from computing the rotation to apply to the first lenses; and discarding the first lenses from the CMAT equipment to prevent the first lenses from being used to produce any portion of any final camera assembly.

Example 15. The method of any preceding example, wherein: the initial MTF performance for the first lenses comprises a center MTF performance and four different corner MTF performances, and further controlling the CMAT equipment to compute the rotation to apply to the first lenses comprises: determining whether the center MTF performance and only two of the four different corner MTF performances satisfy respective MTF thresholds; and responsive to determining that the center MTF performance and only two of the four different corner MTF performances satisfy the respective MTF thresholds, determining a direction of the rotation based on a sequence of four corner positions including a sequence position of a highest of the four different corner MTF performances relative a sequence position of a lowest of the four different corner MTF performances.

Example 16. The method of any preceding example, wherein: the initial MTF performance for the first lenses comprises a center MTF performance and four different corner MTF performances, and further controlling the CMAT equipment to compute the rotation to apply to the first lenses comprises: determining whether the center MTF performance and three of the four different corner MTF performances satisfy respective MTF thresholds; and responsive to determining that the center MTF performance and only three of the four different corner MTF performances satisfy the respective MTF thresholds, determining a direction of the rotation based on a corner position of a highest of the four different corner MTF performances and a corner position of a lowest of the four different corner MTF performances.

Example 17. The method of any preceding example, wherein: the initial MTF performance for the first lenses comprises a center MTF performance and four different corner MTF performances, and further controlling the CMAT equipment to compute the rotation to apply to the first lenses comprises: refraining from computing the rotation to apply to the first lenses in response to determining that the center MTF performance does not satisfy a center MTF threshold; and discarding the first lenses from the CMAT equipment to prevent the first lenses from being used to produce any portion of any final camera assembly.

Example 18. The method of any preceding example, further comprising: identifying a set of second camera components that are loaded into the CMAT equipment for producing the portion of the other final camera assembly with the first lenses that are stored with the rotation applied; controlling, by the processor, the CMAT equipment to execute an initial five-axis lens alignment check that measures another initial MTF performance for the first lenses when dry-fit assembled with the second camera components; and responsive to determining that the other initial MTF performance for the first lenses satisfies the MTF threshold, further controlling, by the processor, the CMAT equipment to use the first lenses for producing the portion of the other final camera assembly with the second camera components.

Example 19. The method of any preceding example, further comprising: further responsive to determining that the other initial MTF performance for the first lenses satisfies the MTF threshold, maintaining, by the processor, alignment parameters for the first lenses when dry-fit assembled with the second camera components, wherein further controlling the CMAT equipment to use the first lenses for producing the portion of the other final camera assembly with the second camera components comprises using the alignment parameters to execute a subsequent five-axis lens alignment check with the first lenses and the second camera components.

Example 20. The method of any preceding example, wherein the alignment parameters comprise a height for the first lenses relative an image sensor of the second camera components and a degree of tilt relative the first lenses and the image sensor.

Example 21. A system comprising means for performing the method of any previous example.

Example 22. A system comprising a processor configured to perform the method of any previous example.

Example 23. A computer readable media including instructions that, when executed, cause a processor to perform the method of any previous example.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to camera systems, similar problems associated with assembling other types of sensors can occur. Therefore, although described to improve camera assembly performance, the techniques of the foregoing description can be adapted and applied to other problems to effectively assemble at low cost sensor devices with high precision.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A method comprising:
    identifying, by a processor of camera modular alignment and test (CMAT) equipment, a set of camera components and a corresponding set of first lenses that are loaded into the CMAT equipment for producing a portion of a final camera assembly;
    controlling, by the processor, the CMAT equipment to execute an initial five-axis lens alignment check that measures an initial modulation transfer function (MTF) performance for the first lenses when dry-fit assembled with the camera components;
    determining, by the processor, whether the initial MTF performance for the first lenses satisfies a MTF threshold; and
    responsive to determining that the initial MTF performance for the first lenses does not satisfy the MTF threshold, further controlling the CMAT equipment to:
        use a set of second lenses that are loaded into the CMAT equipment for producing the portion of the final camera assembly with the camera components;
        compute a rotation to apply to the first lenses for use in producing a portion of another final camera assembly with different camera components; and store the first lenses within the CMAT equipment such that the portion of the other final camera assembly includes the first lenses with the rotation applied.

2. The method of claim 1, wherein controlling the CMAT equipment to store the first lenses within the CMAT equipment comprises incrementing a flag associated with the first lenses to indicate whether the first lenses exceed a maximum number of rotational corrections.

3. The method of claim 2, further comprising:
determining, based on the flag associated with the first lenses, whether the first lenses exceed the maximum number of rotational corrections; and
responsive to determining that the first lenses exceed the maximum number of rotational corrections, discarding the first lenses from the CMAT equipment to prevent the first lenses from being used to produce any portion of any final camera assembly.

4. The method of claim 1, wherein
the initial MTF performance for the first lenses comprises a center MTF performance and four different corner MTF performances, and
further controlling the CMAT equipment to compute the rotation to apply to the first lenses comprises:
determining whether the center MTF performance and at least two of the four different corner MTF performances satisfy respective MTF thresholds; and
responsive to determining that the center MTF performance and at least two of the four different corner MTF performances do not satisfy the respective MTF thresholds:
refraining from computing the rotation to apply to the first lenses; and
discarding the first lenses from the CMAT equipment to prevent the first lenses from being used to produce any portion of any final camera assembly.

5. The method of claim 1, wherein:
the initial MTF performance for the first lenses comprises a center MTF performance and four different corner MTF performances, and
further controlling the CMAT equipment to compute the rotation to apply to the first lenses comprises:
determining whether the center MTF performance and only two of the four different corner MTF performances satisfy respective MTF thresholds; and
responsive to determining that the center MTF performance and only two of the four different corner MTF performances satisfy the respective MTF thresholds, determining a direction of the rotation based on a sequence of four corner positions including a sequence position of a highest of the four different corner MTF performances relative a sequence position of a lowest of the four different corner MTF performances.

6. The method of claim 1, wherein:
the initial MTF performance for the first lenses comprises a center MTF performance and four different corner MTF performances, and
further controlling the CMAT equipment to compute the rotation to apply to the first lenses comprises:
determining whether the center MTF performance and three of the four different corner MTF performances satisfy respective MTF thresholds; and
responsive to determining that the center MTF performance and only three of the four different corner MTF performances satisfy the respective MTF thresholds, determining a direction of the rotation based on a corner position of a highest of the four different corner MTF performances and a corner position of a lowest of the four different corner MTF performances.

7. The method of claim 1, wherein:
the initial MTF performance for the first lenses comprises a center MTF performance and four different corner MTF performances, and
further controlling the CMAT equipment to compute the rotation to apply to the first lenses comprises:
refraining from computing the rotation to apply to the first lenses in response to determining that the center MTF performance does not satisfy a center MTF threshold; and
discarding the first lenses from the CMAT equipment to prevent the first lenses from being used to produce any portion of any final camera assembly.

8. The method of claim 1, further comprising:
identifying a set of second camera components that are loaded into the CMAT equipment for producing the portion of the other final camera assembly with the first lenses that are stored with the rotation applied;
controlling, by the processor, the CMAT equipment to execute an initial five-axis lens alignment check that measures another initial MTF performance for the first lenses when dry-fit assembled with the second camera components; and
responsive to determining that the other initial MTF performance for the first lenses satisfies the MTF threshold, further controlling, by the processor, the CMAT equipment to use the first lenses for producing the portion of the other final camera assembly with the second camera components.

9. The method of claim 8, further comprising:
further responsive to determining that the other initial MTF performance for the first lenses satisfies the MTF threshold, maintaining, by the processor, alignment parameters for the first lenses when dry-fit assembled with the second camera components,
wherein further controlling the CMAT equipment to use the first lenses for producing the portion of the other final camera assembly with the second camera components comprises using the alignment parameters to execute a subsequent five-axis lens alignment check with the first lenses and the second camera components.

10. The method of claim 9, wherein the alignment parameters comprise a height for the first lenses relative an image sensor of the second camera components and a degree of tilt relative the first lenses and the image sensor.

11. A computer-readable storage media comprising instructions that, when executed, cause a processor of camera modular alignment and test (CMAT) equipment to produce a portion of a final camera assembly by:
identifying a set of camera components and a corresponding set of first lenses that are loaded into the CMAT equipment for producing a portion of a final camera assembly;
controlling the CMAT equipment to execute an initial five-axis lens alignment check that measures an initial modulation transfer function (MTF) performance for the first lenses when dry-fit assembled with the camera components;
determining whether the initial MTF performance for the first lenses satisfies a MTF threshold; and
responsive to determining that the initial MTF performance for the first lenses does not satisfy the MTF threshold, further controlling the CMAT equipment to:

use a set of second lenses that are loaded into the CMAT equipment for producing the portion of the final camera assembly with the camera components;

compute a rotation to apply to the first lenses for use in producing a portion of another final camera assembly with different camera components; and store the first lenses within the CMAT equipment such that the portion of the other final camera assembly includes the first lenses with the rotation applied.

12. A system comprising:

means for identifying a set of camera components and a corresponding set of first lenses that are loaded into camera modular alignment and test (CMAT) equipment for producing a portion of a final camera assembly;

means for controlling the CMAT equipment to execute an initial five-axis lens alignment check that measures an initial modulation transfer function (MTF) performance for the first lenses when dry-fit assembled with the camera components;

means for determining whether the initial MTF performance for the first lenses satisfies a MTF threshold; and means for, responsive to determining that the initial MTF performance for the first lenses does not satisfy the MTF threshold, further controlling the CMAT equipment to:

use a set of second lenses that are loaded into the CMAT equipment for producing the portion of the final camera assembly with the camera components;

compute a rotation to apply to the first lenses for use in producing a portion of another final camera assembly with different camera components; and store the first lenses within the CMAT equipment such that the portion of the other final camera assembly includes the first lenses with the rotation applied.

13. The system of claim 12, wherein the means for controlling the CMAT equipment to store the first lenses within the CMAT equipment comprise means for incrementing a flag associated with the first lenses to indicate whether the first lenses exceed a maximum number of rotational corrections.

14. The system of claim 13, further comprising:

means for determining, based on the flag associated with the first lenses, whether the first lenses exceed the maximum number of rotational corrections; and means for, responsive to determining that the first lenses exceed the maximum number of rotational corrections, discarding the first lenses from the CMAT equipment to prevent the first lenses from being used to produce any portion of any final camera assembly.

15. The system of claim 12, wherein:

the initial MTF performance for the first lenses comprises a center MTF performance and four different corner MTF performances, and the means for further controlling the CMAT equipment to compute the rotation to apply to the first lenses comprise means for:

determining whether the center MTF performance and at least two of the four different corner MTF performances satisfy respective MTF thresholds;

responsive to determining that the center MTF performance and at least two of the four different corner MTF performances do not satisfy the respective MTF thresholds:

refraining from computing the rotation to apply to the first lenses; and discarding the first lenses from the CMAT equipment to prevent the first lenses from being used to produce any portion of any final camera assembly.

16. The system of claim 12, wherein:

the initial MTF performance for the first lenses comprises a center MTF performance and four different corner MTF performances, and the means for further controlling the CMAT equipment to compute the rotation to apply to the first lenses comprise means for:

determining whether the center MTF performance and only two of the four different corner MTF performances satisfy respective MTF thresholds; and responsive to determining that the center MTF performance and only two of the four different corner MTF performances satisfy the respective MTF thresholds, determining a direction of the rotation based on a sequence of four corner positions including a sequence position of a highest of the four different corner MTF performances relative a sequence position of a lowest of the four different corner MTF performances.

17. The system of claim 12, wherein:

the initial MTF performance for the first lenses comprises a center MTF performance and four different corner MTF performances, and the means for further controlling the CMAT equipment to compute the rotation to apply to the first lenses comprise means for:

determining whether the center MTF performance and three of the four different corner MTF performances satisfy respective MTF thresholds; and responsive to determining that the center MTF performance and only three of the four different corner MTF performances satisfy the respective MTF thresholds, determining a direction of the rotation based on a corner position of a highest of the four different corner MTF performances and a corner position of a lowest of the four different corner MTF performances.

18. The system of claim 12, wherein:

the initial MTF performance for the first lenses comprises a center MTF performance and four different corner MTF performances, and the means for further controlling the CMAT equipment to compute the rotation to apply to the first lenses comprise means for:

refraining from computing the rotation to apply to the first lenses in response to determining that the center MTF performance does not satisfy a center MTF threshold; and discarding the first lenses from the CMAT equipment to prevent the first lenses from being used to produce any portion of any final camera assembly.

19. The system of claim 12, further comprising:

means for identifying a set of second camera components that are loaded into the CMAT equipment for producing the portion of the other final camera assembly with the first lenses that are stored with the rotation applied;

means for controlling the CMAT equipment to execute an initial five-axis lens alignment check that measures another initial MTF performance for the first lenses when dry-fit assembled with the second camera components; and means for, responsive to determining that the other initial MTF performance for the first lenses satisfies the MTF threshold, further controlling the CMAT equipment to use the first lenses for producing the portion of the other final camera assembly with the second camera components.

20. The system of claim 19, further comprising:

means for, further responsive to determining that the other initial MTF performance for the first lenses satisfies the MTF threshold, maintaining alignment parameters for the first lenses when dry-fit assembled with the second camera components, wherein the means for further controlling the CMAT equipment to use the first lenses for producing the portion of the other final camera assembly with the second camera components comprise means for using the alignment parameters to execute a subsequent five-axis lens alignment check with the first lenses and the second camera components, and wherein the alignment parameters comprise a height for the first lenses relative an image sensor of the second camera components and a degree of tilt relative the first lenses and the image sensor.

* * * * *